(12) United States Patent
Takahashi et al.

(10) Patent No.: US 12,393,362 B2
(45) Date of Patent: Aug. 19, 2025

(54) ELECTRONIC APPARATUS, SYSTEM, AND METHOD FOR ERASING DATA STORED IN STORAGE DEVICE OF ELECTRONIC APPARATUS

(71) Applicant: Panasonic Intellectual Property Management Co., Ltd., Osaka (JP)

(72) Inventors: Katsunao Takahashi, Osaka (JP); Kengo Tsuzuki, Osaka (JP); Masanori Kitamikado, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 32 days.

(21) Appl. No.: 18/519,007

(22) Filed: Nov. 26, 2023

(65) Prior Publication Data

US 2024/0094938 A1    Mar. 21, 2024

Related U.S. Application Data

(63) Continuation of application No. PCT/JP2022/022259, filed on Jun. 1, 2022.

(30) Foreign Application Priority Data

Jun. 2, 2021  (JP) .............................. JP2021-093007
Oct. 28, 2021  (JP) .............................. JP2021-176705

(51) Int. Cl.
G06F 3/06    (2006.01)

(52) U.S. Cl.
CPC .......... G06F 3/0652 (2013.01); G06F 3/0608 (2013.01); G06F 3/067 (2013.01)

(58) Field of Classification Search
CPC ...... G06F 3/0652; G06F 3/0608; G06F 3/067; G06F 21/44; G06F 21/60; G06F 2212/2143
See application file for complete search history.

(56) References Cited

U.S. PATENT DOCUMENTS 7,694,345 B2 * 4/2010 Mullins ................... G06F 21/31
                                                            726/28
2003/0156200 A1 * 8/2003 Romano ............ H04N 1/00278
                                                            348/207.99

(Continued)

FOREIGN PATENT DOCUMENTS

JP          03976227 B2    9/2007
JP        2007-293401 A   11/2007

(Continued)

OTHER PUBLICATIONS

International Search Report for corresponding Application No. PCT/JP2022/022259, mailed Aug. 2, 2022.

*Primary Examiner* — Tracy C Chan

(74) *Attorney, Agent, or Firm* — Renner, Otto, Boisselle & Sklar, LLP

(57) ABSTRACT

An electronic apparatus includes a first storage device and a processor. The processor causes a server device to register the electronic apparatus by transmitting a first signal including identification information for identifying the first storage device, transmits, to the server device, a second signal including identification information of the first storage device and inquiring whether or not it is registered in the server device that data stored in the first storage device is to be erased, and erases the data stored in the first storage device when the electronic apparatus receives a third signal instructing erasure of the data stored in the first storage device. The third signal is transmitted when the identification information of the first storage device matches the identification information of the first storage device and it is registered in the server device that the data stored in the first storage device is to be erased.

16 Claims, 23 Drawing Sheets

(56) References Cited

U.S. PATENT DOCUMENTS

| | | | | |
|---|---|---|---|---|
| 2005/0262299 | A1* | 11/2005 | Mimatsu | H04L 67/1097 |
| | | | | 711/170 |
| 2012/0044539 | A1* | 2/2012 | Yamaguchi | H04N 1/4433 |
| | | | | 358/1.16 |
| 2016/0004648 | A1* | 1/2016 | Mukouchi | G06F 12/1458 |
| | | | | 726/30 |
| 2016/0188249 | A1 | 6/2016 | Kang et al. | |
| 2021/0234973 | A1 | 7/2021 | Hou | |

FOREIGN PATENT DOCUMENTS

| | | | |
|---|---|---|---|
| JP | 04493677 | B2 | 6/2010 |
| JP | 2014115724 | A * | 6/2014 |
| JP | 2018-092297 | A | 6/2018 |
| JP | 2018-136778 | A | 8/2018 |
| JP | 2018-139025 | A | 9/2018 |
| JP | 2018039025 | A * | 9/2018 |
| JP | 2020-024600 | A | 2/2020 |
| WO | 2014/167721 | A1 | 10/2014 |

\* cited by examiner

| No. | CLIENT NUMBER | GROUP NUMBER | INFORMATION OF CLIENT DEVICE 1 ||||  INFORMATION OF STORAGE DEVICE 13 ||||| ERASURE FLAG | PROCESSING NUMBER | ERASURE START TIME | ERASURE END TIME |
|---|---|---|---|---|---|---|---|---|---|---|---|---|---|---|
| | | | MANUFACTURER | MODEL | SERIAL NUMBER | UUID | MANUFACTURER | MODEL | SERIAL NUMBER | UUID | CAPACITY | | | | |
| 1 | 001 | 001 | AA COMPANY | DEF | 123456 | ABCD | JJ COMPANY | MNO | 456789 | HIJK | 500GB | ERASURE | 0100 | - | - |
| 2 | 001 | 001 | AA COMPANY | DEF | 123457 | BCDE | JJ COMPANY | MNO | 456790 | IJKL | 500GB | ERASURE | 0101 | - | - |
| 3 | 001 | 002 | BB COMPANY | GHI | 234567 | CDEF | KK COMPANY | PQR | 567890 | JKLM | 1TB | - | - | - | - |
| 4 | 002 | 010 | AA COMPANY | DEF | 345678 | DEFG | LL COMPANY | STU | 678901 | KLMN | 2TB | - | - | - | - |

ELECTRONIC APPARATUS, SYSTEM, AND METHOD FOR ERASING DATA STORED IN STORAGE DEVICE OF ELECTRONIC APPARATUS

BACKGROUND

1. Technical Field

The present disclosure relates to an electronic apparatus, a system, and a method for erasing data stored in a storage device of an electronic apparatus.

2. Description of the Related Art

When an organization such as a company discards an electronic apparatus such as a personal computer, it is required to erase data stored in the storage device in order to avoid leakage of confidential information on business.

Patent Literature (PTL) 1 discloses a data erasure management method for implementing data erasure processing in a storage device in a terminal of a management target, and recording and managing an implementation result in a management database for each management target terminal.

PTL 1 is Japanese Patent No. 4493677.

SUMMARY

When a certain organization manages a large number of electronic apparatuses, there is a risk of erroneously erasing data stored in a storage device of an electronic apparatus that is not an erasure target. It takes time and effort to erase data stored in storage devices of a large number of electronic apparatuses. Therefore, it is required to specify, without an error, data stored in a storage device and easily erase the data.

The present disclosure provides an electronic apparatus capable of specifying, without an error, data stored in a storage device and easily erasing the data. The present disclosure provides a system including such an electronic apparatus and a server device. The present disclosure also provides a method for erasing data stored in a storage device of an electronic apparatus.

An electronic apparatus according to one aspect of the present disclosure includes a first storage device, a communication device, and a processor. The processor causes a server device to register the electronic apparatus by transmitting a first signal to the server device using the communication device, the first signal including identification information for uniquely identifying the first storage device. The processor transmits a second signal to the server device using the communication device, the second signal including identification information of the first storage device, and inquiring whether or not it is registered in the server device that data stored in the first storage device is to be erased. The processor erases the data stored in the first storage device when the electronic apparatus receives a third signal from the server device using the communication device, the third signal instructing erasure of the data stored in the first storage device, the processor erases the data stored in the first storage device. The third signal is transmitted from the server device to the electronic apparatus when the server device determines that the identification information of the first storage device included in the second signal matches the identification information of the first storage device included in the first signal, and it is registered in the server device that the data stored in the first storage device is to be erased.

According to an electronic apparatus according to one aspect of the present disclosure, it is possible to specify, without an error, data stored in a storage device and easily erase the data.

BRIEF DESCRIPTION OF THE DRAWINGS

FIG. 9 is a view illustrating exemplary content of management table 22a stored in memory 22 of FIG. 3.

Figure 23:
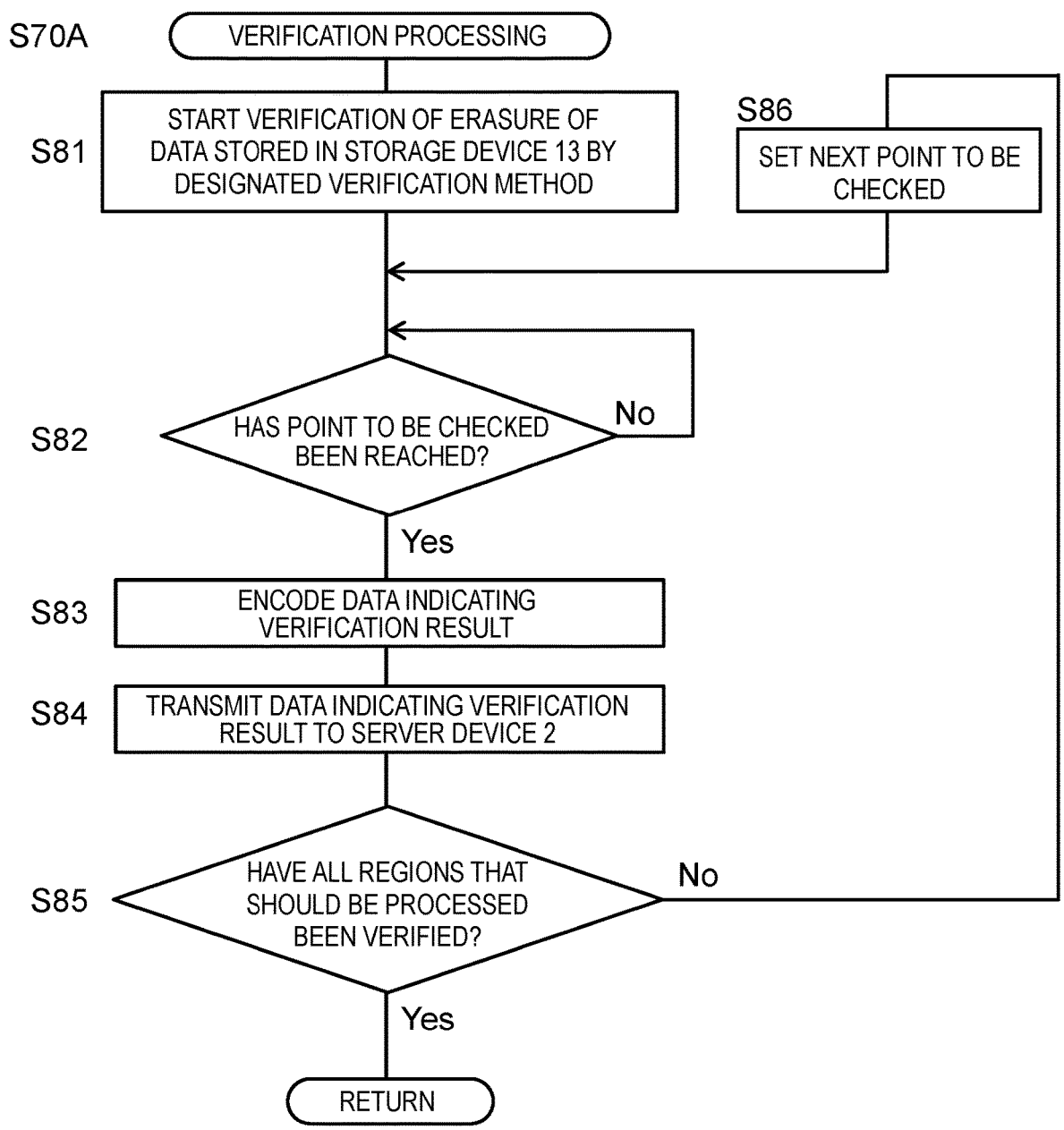

FIG. 23 is a flowchart showing a subroutine of step S70A (verification processing) executed by processor 11 of client device 1, which is an operation of the system according to a variation of the second exemplary embodiment.

Figure 24:
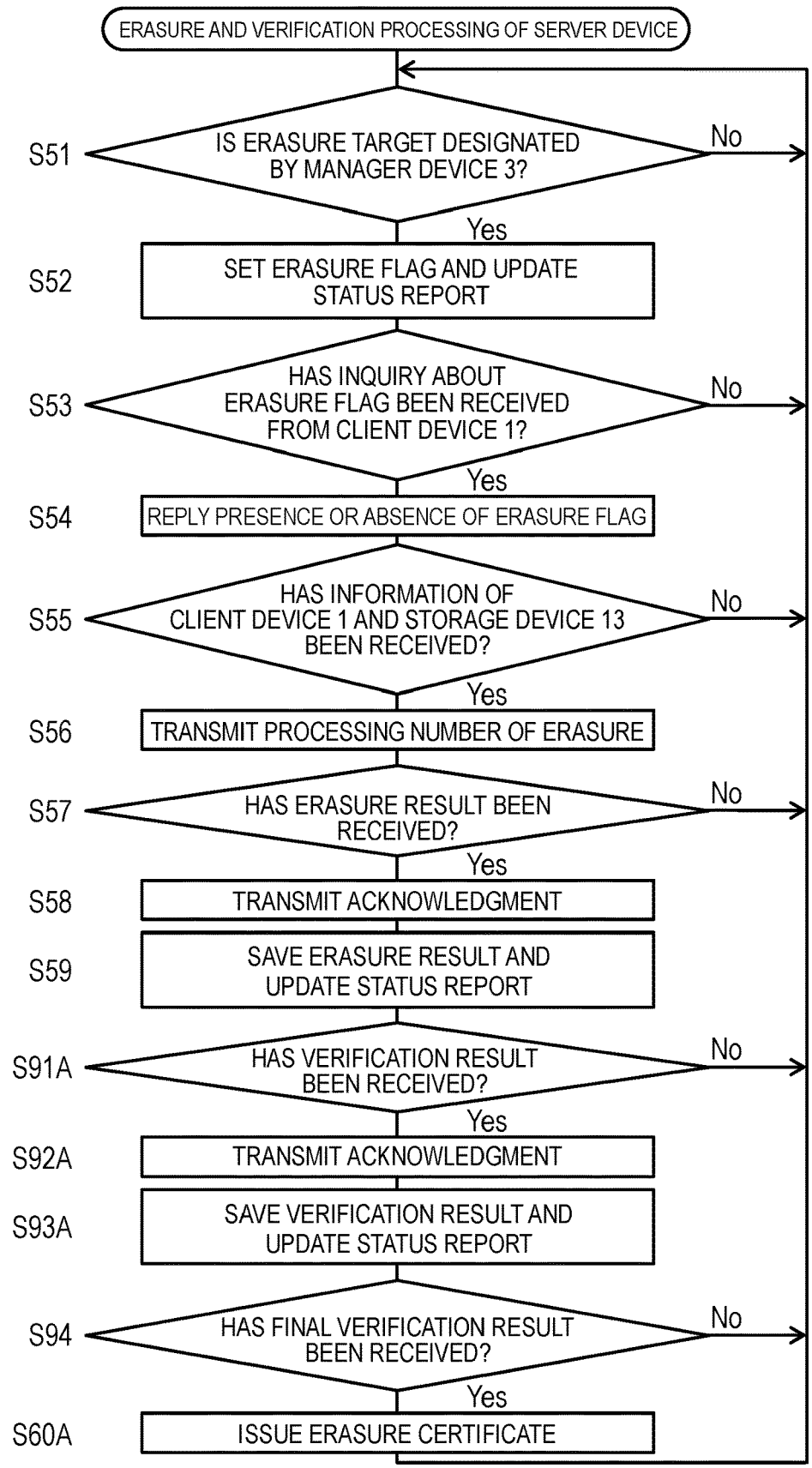

FIG. 24 is a flowchart showing erasure and verification processing of server device 2 executed by processor 21, which are the operation of the system according to the variation of the second exemplary embodiment.

DETAILED DESCRIPTION

Exemplary embodiments will now be described below in detail with reference to the drawings as appropriate. However, unnecessarily detailed description may be omitted. For example, the detailed description of already well-known matters and the overlap description of approximately the same configurations may not be described. This is to avoid an unnecessarily redundant description below and to facilitate understanding by those skilled in the art.

Note that the inventors of the present disclosure provide the accompanying drawings and the following description for those skilled in the art to fully understand the present disclosure, and do not provide them to intend to limit the subject matter described in the scope of claims.

First Exemplary Embodiment

Configuration of First Exemplary Embodiment

Figure 1:
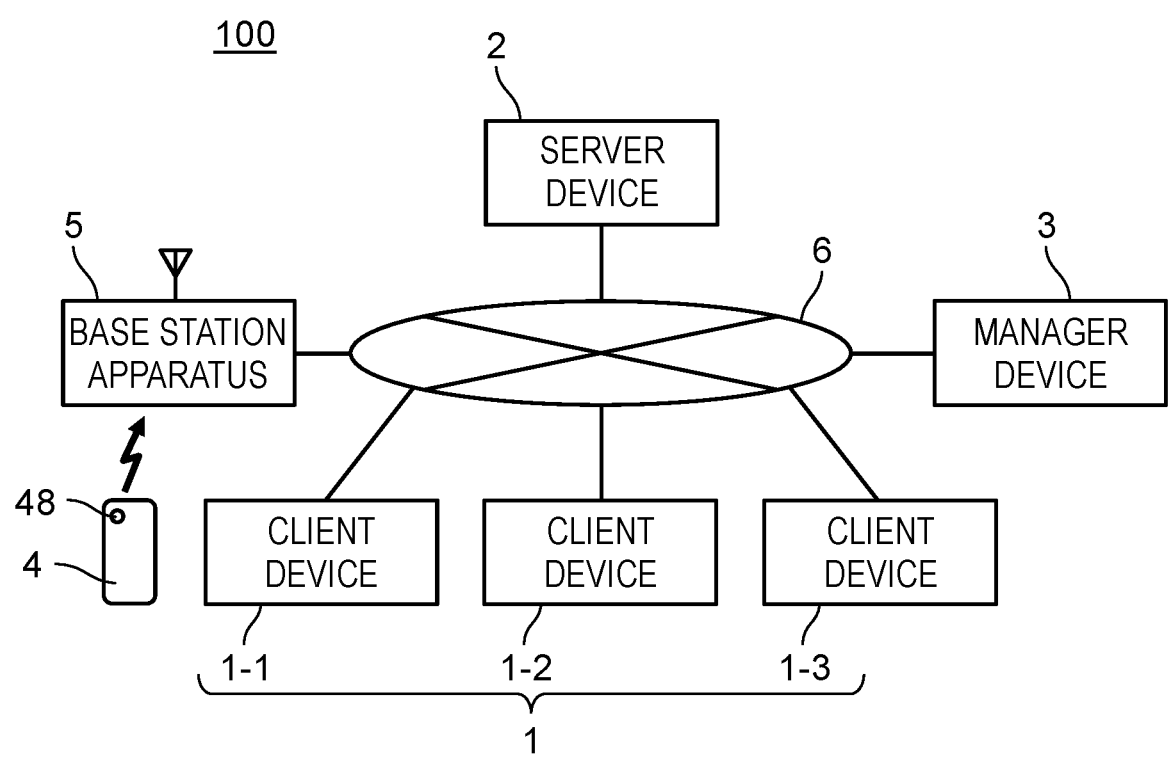
FIG. 1 is a schematic diagram illustrating a configuration of system 100 according to a first exemplary embodiment.

FIG. 1 is a schematic diagram illustrating the configuration of system 100 according to the first exemplary embodiment. System 100 of FIG. 1 includes a plurality of client devices 1-1 to 1-3, server device 2, manager device 3, user terminal device 4, base station apparatus 5, and communication line 6.

Client devices 1-1 to 1-3 are communicably connected to server device 2 via communication line 6. Client devices 1-1 to 1-3 are, for example, electronic apparatuses including a storage device (described later) such as a personal computer or a mobile phone.

In the present description, client devices 1-1 to 1-3 are also collectively called "client device 1".

Server device 2 manages erasure of data stored in a storage device of each client device 1.

Manager device 3 is communicably connected to server device 2 via communication line 6. A manager of each client device 1 accesses server device 2 using manager device 3 and designates a storage device from which stored data should be erased.

User terminal device 4 is an electronic device including camera 48 and a communication device, for example, a mobile phone. User terminal device 4 is communicably connected to server device 2 via base station apparatus 5.

Communication line 6 is, for example, a local area network (LAN), the Internet, or a combination thereof.

For example, each client device 1 and manager device 3 may be owned by an organization such as a company, whilst server device 2 may be operated by a third party different from this organization. In this case, the organization that owns each client device 1 and manager device 3 signs a contract for managing erasure of data stored in the storage device of each client device 1 with a business operator of server device 2 and becomes a client of this business operator.

In the present description, "erasure" means making stored original data unreadable, and the original data may be unreadable by being overwritten with other data, for example, "0", "1", a random value, or the like, or the original data may be unreadable by executing a command erasure function (e.g., a secure erase command) built in in a firmware program of the storage device.

Figure 2:
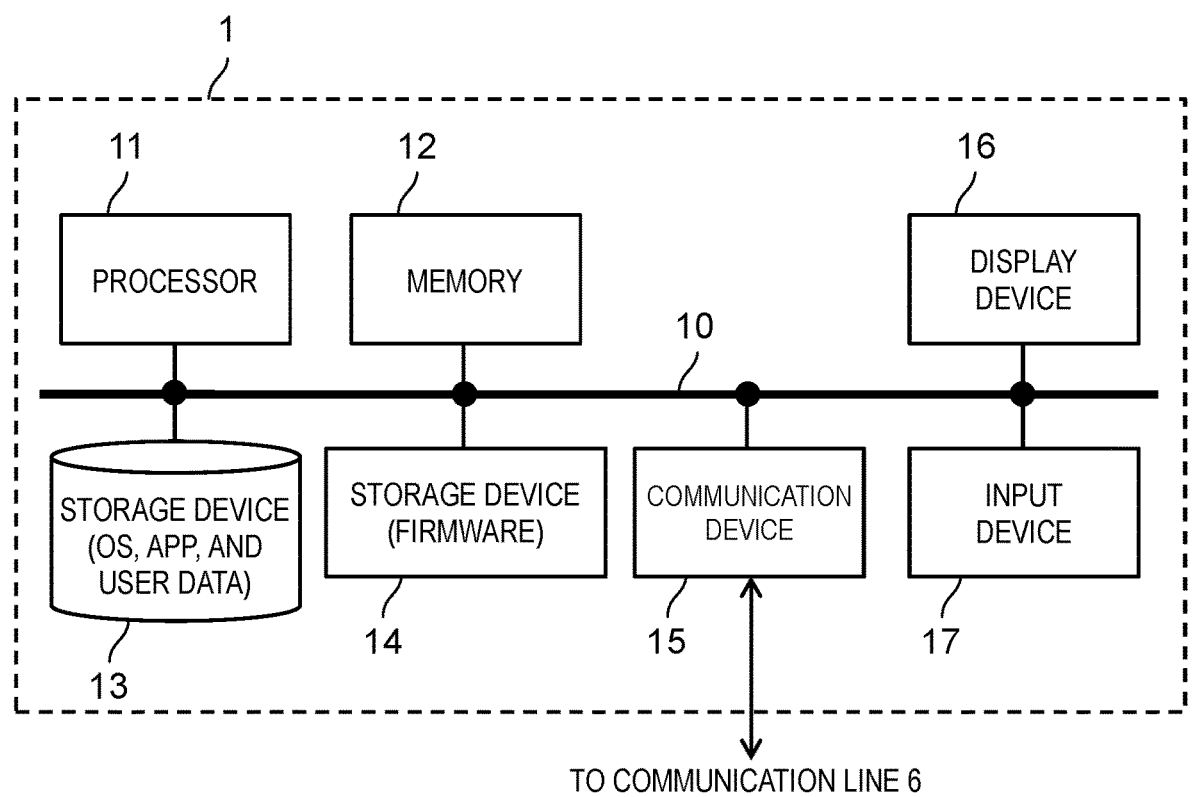
FIG. 2 is a block diagram illustrating a configuration of client device 1 of FIG. 1.

FIG. 2 is a block diagram illustrating the configuration of client device 1 of FIG. 1. Client device 1 includes bus 10, processor 11, memory 12, storage device 13, storage device 14, communication device 15, display device 16, and input device 17. Processor 11 controls the entire operation of client device 1, and erases data stored in storage device 13, for example. Memory 12 temporarily stores a program and data necessary for the operation of client device 1. Storage device 13 stores data including an operating system (OS), a plurality of application programs (APP), and user data. Storage device 13 is a nonvolatile storage medium such as a hard disk drive (HDD) or a solid state drive (SSD). Storage device 14 stores a firmware program of client device 1, for example, a unified extensible firmware interface (UEFI) or basic input/output system (BIOS) program. Storage device 14 is a nonvolatile storage medium such as a flash memory, for example. Communication device 15 is communicably connected to server device 2 via communication line 6. Display device 16 displays information related to the state of client device 1, and displays an image including information related to erasure of data stored in storage device 13, for example. Input device 17 receives a user input for controlling the operation of client device 1, for example, a user input related to erasure of data stored in storage device 13. Input device 17 includes, for example, a keyboard and a pointing device. Processor 11, memory 12, storage device 13, storage device 14, communication device 15, display device 16, and input device 17 are connected to one another via bus 10.

Figure 3:
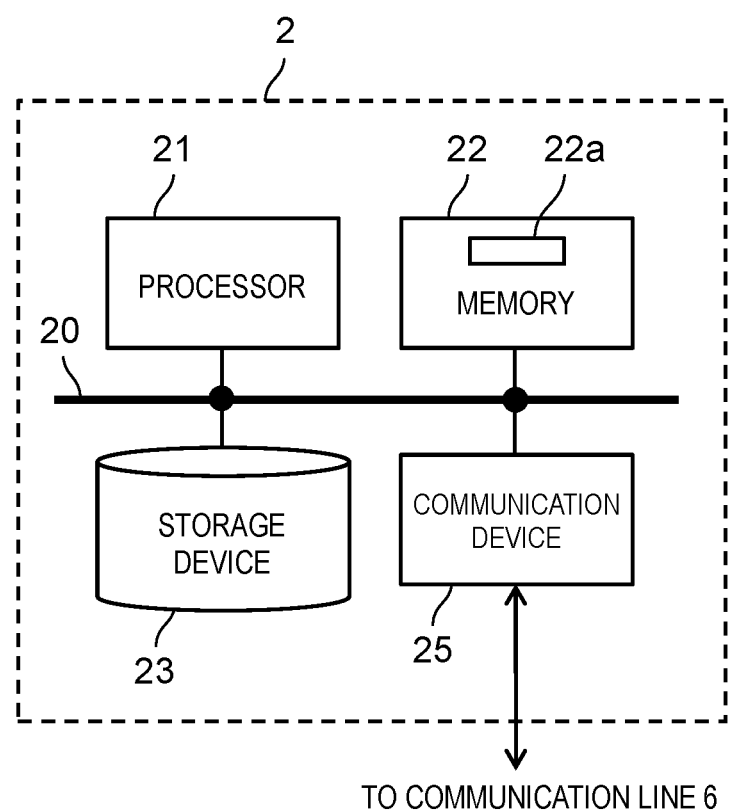
FIG. 3 is a block diagram illustrating a configuration of server device 2 of FIG. 1.

FIG. 3 is a block diagram illustrating the configuration of server device 2 of FIG. 1. Server device 2 includes bus 20, processor 21, memory 22, storage device 23, and communication device 25. Processor 21 controls the entire operation of server device 2 and manages erasure of data stored in storage device 13 of each client device 1. Memory 22 temporarily stores a program and data necessary for the operation of server device 2. For example, memory 22 stores management table 22a for managing erasure of data stored in storage device 13 of each client device 1. Storage device 23 is a nonvolatile storage medium that stores a program necessary for the operation of server device 2. Communication device 25 is communicably connected to each client device 1 and manager device 3 via communication line 6. Processor 21, memory 22, storage device 23, and communication device 25 are connected to one another via bus 20.

Figure 4:
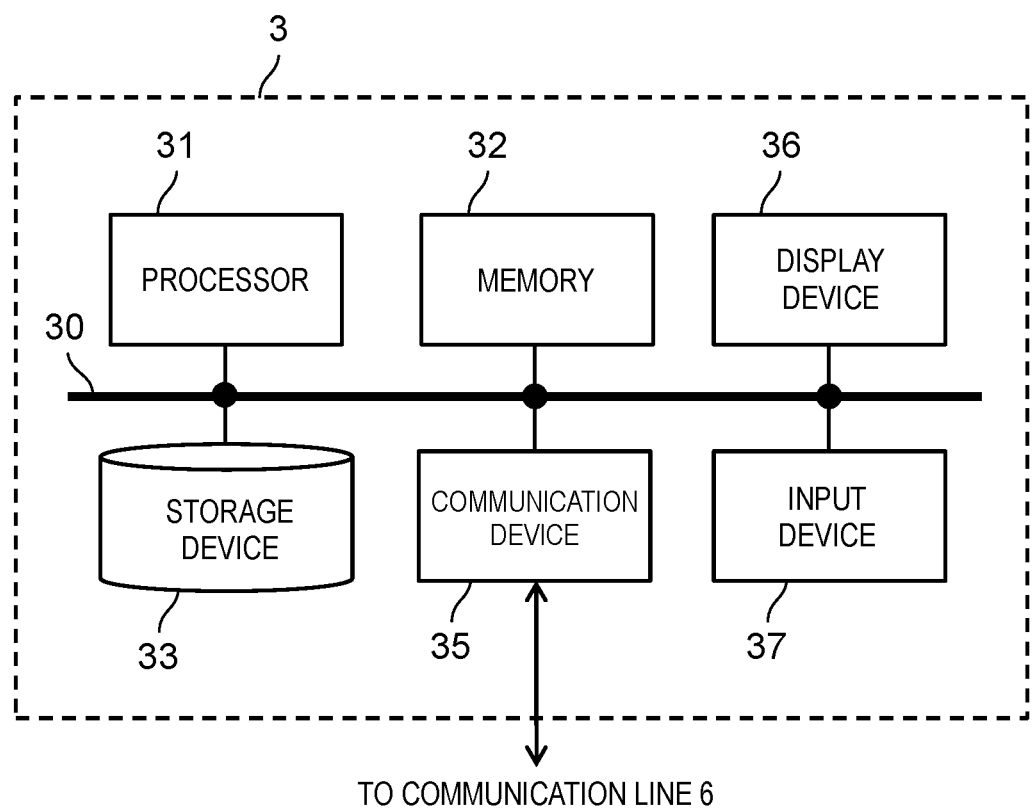
FIG. 4 is a block diagram illustrating a configuration of manager device 3 of FIG. 1.

FIG. 4 is a block diagram illustrating the configuration of manager device 3 of FIG. 1. Manager device 3 includes bus 30, processor 31, memory 32, storage device 33, communication device 35, display device 36, and input device 37. Processor 31 controls the entire operation of manager device 3. Memory 32 temporarily stores a program and data necessary for the operation of manager device 3. Storage device 33 is a nonvolatile storage medium that stores a program necessary for the operation of manager device 3. Communication device 35 is communicably connected to server device 2 via communication line 6. Display device 36 displays information related to the state of manager device 3. Input device 37 receives a user input for controlling the operation of manager device 3. Input device 37 includes, for example, a keyboard and a pointing device. Processor 31, memory 32, storage device 33, communication device 35, display device 36, and input device 37 are connected to one another via bus 30.

In order to manage erasure of data stored in the storage device of each client device 1, server device 2 provides an interface accessible by manager device 3, for example, an interface based on a web page. In this case, server device 2 executes an application program of a web server, and manager device 3 executes an application program of a web browser to access the web server of server device 2.

Figure 5:
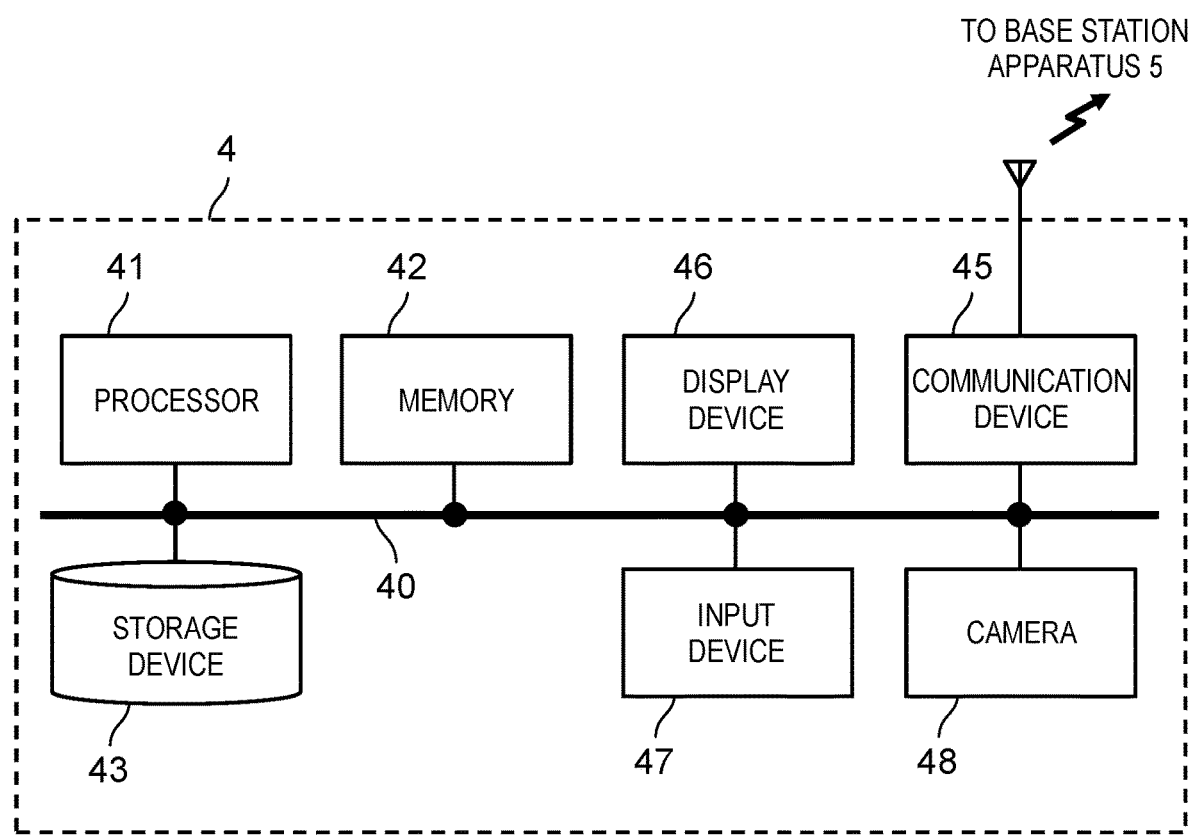
FIG. 5 is a block diagram illustrating a configuration of user terminal device 4 of FIG. 1.

FIG. 5 is a block diagram illustrating the configuration of user terminal device 4 of FIG. 1. User terminal device 4 includes bus 40, processor 41, memory 42, storage device 43, communication device 45, display device 46, input device 47, and camera 48. Processor 41 controls the entire operation of user terminal device 4. Memory 42 temporarily stores a program and data necessary for the operation of user terminal device 4. Storage device 43 is a nonvolatile storage medium that stores a program necessary for the operation of user terminal device 4. Communication device 45 is communicably connected to server device 2 via base station apparatus 5. Display device 46 displays information related to the state of user terminal device 4. Input device 47 receives a user input for controlling the operation of user terminal device 4. Input device 47 includes, for example, a switch and a touch panel. Camera 48 captures an image displayed on display device 16 of client device 1, for example. As described later, an image (e.g., a two-dimensional barcode) including information related to erasure of data stored in storage device 13 of client device 1 may be displayed on display device 16 of client device 1. In this case, user terminal device 4 transmits the content of the captured image to server device 2 via base station apparatus 5. Processor 41, memory 42, storage device 43, communication device 45, display device 46, input device 47, and camera 48 are connected to one another via bus 40.

Operation of First Exemplary Embodiment

As mentioned earlier, in client device 1, storage device 13 stores an operating system and a plurality of application programs, and storage device 14 stores a firmware program. The operating system, each application program, and the firmware program are executed by processor 11. In general, when client device 1 is started up, the firmware program is executed first, and then the operating system is invoked from the firmware program. The application program is executed on the operating system. The application program accesses each hardware device (storage device 13, storage device 14, communication device 15, display device 16, and input device 17) of client device 1 via the operating system. On the other hand, the firmware program directly accesses each hardware device of client device 1 not via the operating system. One of the application programs is an erasure application program for erasing data stored in storage device 13. Client device 1 is configured to erase data stored in storage device 13 by executing the erasure application program and the firmware program.

Figure 6:
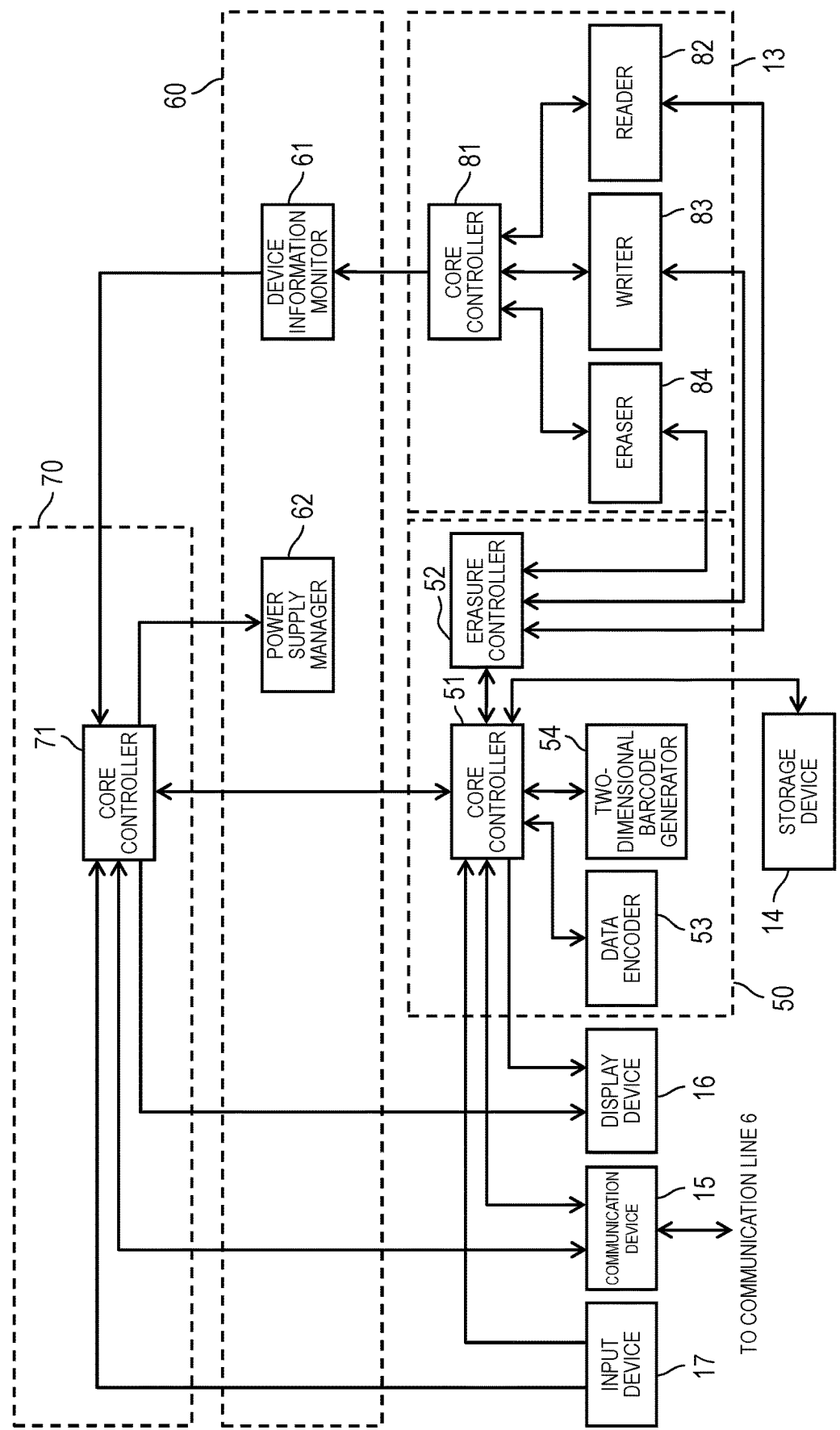
FIG. 6 is a schematic diagram illustrating functional blocks of firmware program 50 and erasure application program 70 executed by processor 11 of FIG. 2.

FIG. 6 is a schematic diagram illustrating functional blocks of firmware program 50 and erasure application program 70 executed by processor 11 of FIG. 2.

Firmware program 50 includes, for example, core controller 51, erasure controller 52, data encoder 53, and two-dimensional barcode generator 54 as functional blocks thereof. Core controller 51 controls other functional blocks of firmware program 50, controls input and output of data among the functional blocks, and controls input and output of data to and from the outside of firmware program 50. Erasure controller 52 controls erasure of data stored in storage device 13. Data encoder 53 encodes, by a predetermined encoding method, erasure result information indicating whether or not erasure of all the data stored in storage device 13 has been successful. Two-dimensional barcode generator 54 generates a two-dimensional barcode including erasure result information (including erasure completion information when the erasure of the data has been succeeded) indicating whether or not erasure of all the data stored in storage device 13 has been succeeded.

Operating system 60 provides an interface for each hardware device (storage device 13, storage device 14, communication device 15, display device 16, and input device 17) of client device 1 to erasure application program 70 and other application programs (not illustrated). Operating system 60 includes, for example, device information monitor 61 and power supply manager 62 as functional blocks thereof. Device information monitor 61 acquires information of client device 1 from client device 1, and acquires information of various components of client device 1 from the components. The example of FIG. 6 illustrates a case where device information monitor 61 acquires information of storage device 13 of client device 1. The information of client device 1 includes, for example, a manufacturer, a model, a serial number, and a universally unique identifier (UUID) of client device 1. The information of storage device 13 includes, for example, a manufacturer, a model, a serial number, a UUID, and a capacity of storage device 13. Power supply manager 62 controls stop, suspend, pause, and restart of client device 1.

By using at least some of the manufacturer of client device 1, the model of client device 1, the serial number of client device 1, the UUID of client device 1, the manufacturer of storage device 13, the model of storage device 13, the serial number of storage device 13, the UUID of storage device 13, and the capacity of storage device 13, it is possible to identify storage device 13 of each client device 1 under the management of certain server device 2 from one another. Therefore, at least some of the manufacturer of client device 1, the model of client device 1, the serial number of client device 1, the UUID of client device 1, the manufacturer of storage device 13, the model of storage device 13, the serial number of storage device 13, the UUID of storage device 13, and the capacity of storage device 13 can be used as identification information for uniquely identifying storage device 13.

Erasure application program 70 includes, for example, core controller 71 as a functional block thereof. Core controller 71 controls other functional blocks (not illustrated) of erasure application program 70, controls input and output of data among the functional blocks, and controls input and output of data to and from the outside of erasure application program 70.

Storage device 13 of client device 1 executes a firmware program including the functional blocks illustrated in FIG. 6. Storage device 13 includes, for example, core controller 81, reader 82, writer 83, and eraser 84 as functional blocks thereof. Core controller 81 controls other functional blocks of storage device 13 and controls input and output of data among the functional blocks. Reader 82 reads data from a storage medium (not illustrated) of storage device 13. Writer 83 writes data into the storage medium of storage device 13 (including a case of erasing the original data by overwriting with "0", "1", a random value, or the like). Eraser 84 erases data in the storage medium of storage device 13 (including a case of erasing data by executing a secure erase command built in in the firmware program).

Hereinafter, the operation of client device 1 will be described with reference to each functional block of FIG. 6, and the operation of server device 2 will be described.

Figure 7:
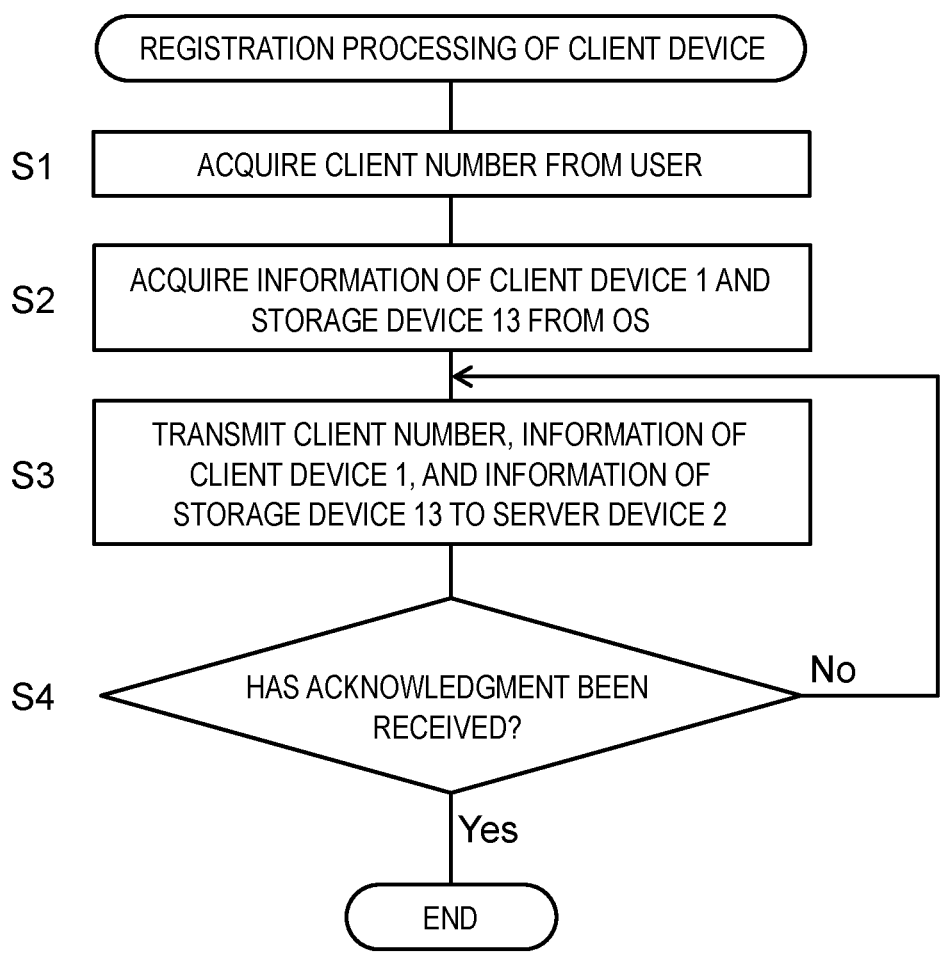
FIG. 7 is a flowchart showing registration processing by erasure application program 70 executed by processor 11 of FIG. 2.
Figure 8:
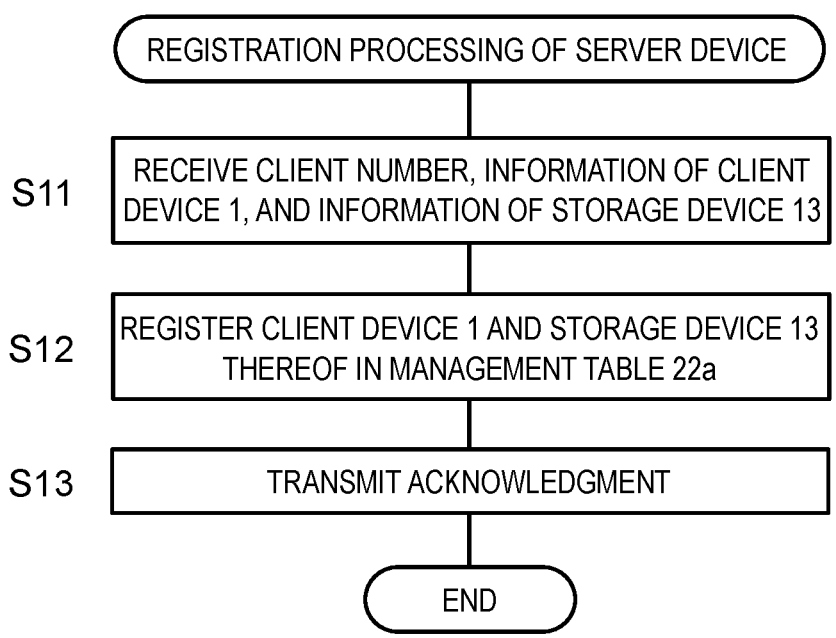
FIG. 8 is a flowchart showing registration processing of server device 2 executed by processor 21 of FIG. 3.

FIG. 7 is a flowchart showing registration processing of client device 1 by erasure application program 70 executed by processor 11 of FIG. 2. FIG. 8 is a flowchart showing registration processing of server device 2 executed by processor 21 of FIG. 3.

In a case where the organization that owns each client device 1 is not registered in server device 2, before the registration processing of FIG. 7 is executed, the manager or another person in charge in the organization that owns each client device 1 acquires the following information from server device 2.

Account information (client ID and password) of server device 2

Uniform resource locator (URL) of erasure application program 70

Client number (serial number associated with account information and assigned for each client)

Since the client number is generated for each client, that is, for each contract for managing erasure of data stored in the storage device of each client device 1, the client number is not identification information of each client device 1 or storage device 13.

Each client device 1 accesses the URL of erasure application program 70, and downloads and installs erasure application program 70. After installation, erasure application program 70 is started up automatically or manually. After erasure application program 70 is started up, processor 11 executes the registration processing of FIG. 7 in order to register storage device 13 of client device 1 into server device 2.

In step S1 of FIG. 7, core controller 71 of client device 1 displays, on display device 16, a dialog box prompting input of the client number assigned to the organization that owns client device 1. The user of client device 1 inputs the client number using input device 17 in accordance with the dialog box. Core controller 71 acquires the client number from the user via input device 17.

In step S2, core controller 71 of client device 1 acquires the information of client device 1 and the information of storage device 13 from device information monitor 61 of operating system 60.

In step S3, by using communication device 15, core controller 71 of client device 1 transmits the client number, the information of client device 1, and the information of storage device 13 to server device 2.

In step S11 of FIG. 8, server device 2 receives the client number, the information of client device 1, and the information of storage device 13. In step S12, server device 2 registers client device 1 and storage device 13 thereof into management table 22a as new management targets. When client device 1 and storage device 13 thereof are registered, server device 2 transmits an acknowledgment signal to client device 1 in step S13.

In step S4 of FIG. 7, core controller 71 of client device 1 determines whether or not to have received the acknowledgment signal from server device 2. When YES, the process ends, and when NO the process returns to step S3.

By executing the registration processing of FIGS. 7 and 8, storage device 13 of client device 1 is registered in management table 22a of server device 2 as a new management target. According to the registration processing of FIGS. 7 and 8, the user of client device 1 only needs to input the client number using input device 17, and the information of client device 1 and the information of storage device 13 are automatically transmitted from client device 1 to server device 2. According to the registration processing of FIGS. 7 and 8, the user of client device 1 does not need to be conscious of the organization to which the user belongs (or the organization that owns client device 1), and server device 2 automatically classifies registered storage device 13 for each client based on the client number.

After storage device 13 of each client device 1 is registered in server device 2, the manager of the organization that owns each client device 1 registers in server device 2 that the data stored in storage device 13 should be erased as necessary. Therefore, the manager first accesses server device 2 using manager device 3 and logs in to server device 2 using account information. Next, while browsing a list of storage devices 13 registered in management table 22a, the manager sets an erasure flag indicating that the stored data should be erased to one or a plurality of storage devices 13.

FIG. 9 is a view illustrating exemplary content of management table 22a stored in memory 22 of FIG. 3. Management table 22a includes, for example, a client number, a group number, information of client device 1, information of storage device 13, an erasure flag, a processing number, an erasure start time, and an erasure end time for each client device 1 or storage device 13 that becomes a management target.

As mentioned earlier, the client number is assigned to each client. The group number is assigned to an arbitrary sub-organization (group) that is a part of a client's organization. For example, when the client is a company, the group may be a department or a section of the company. As mentioned earlier, the information of client device 1 includes, for example, the manufacturer, the model, the serial number, and the UUID of client device 1. As mentioned earlier, the information of storage device 13 includes, for example, the manufacturer, the model, the serial number, the UUID, and the capacity of storage device 13. As mentioned earlier, the erasure flag indicates that the data stored in storage device 13 should be erased. The processing number is issued for each storage device 13 set by an erasure flag that the data stored in storage device 13 should be erased. The erasure start time and the erasure end time indicate the time when the erasure of the data stored in storage device 13 is actually started and the time when the erasure of the data stored in storage device 13 is actually ended.

The client number is provided by server device 2. The group number, the information of client device 1, and the information of storage device 13 are provided by client device 1. The erasure flag is set using manager device 3 by the manager of the organization that owns each client device 1. The processing number is provided by the server device when an erasure flag indicating that the stored data should be erased is set. The erasure start time and the erasure end time are acquired when the data stored in storage device 13 is actually erased.

Server device 2 may generate a status report indicating the states of each client device 1 and each storage device 13 based on management table 22a. The status report indicates, for example, which of the following states each storage device 13 is in.

Erasure flag already set

Erasing

Erasure completed

Erasure completed and erasure certificate already issued

Erasure failed

The erasure certificate will be described later.

The status report may further include the following information.

Date and time of setting of erasure flag
Erasure approver
Erasure start date and time
Erasure completion date and time
Erasure method
Manufacturer, model, and serial number of client device 1
Manufacturer, model, serial number, and capacity of storage device 13

The manager can view the status report by accessing server device 2 using manager device 3.

Figure 10:
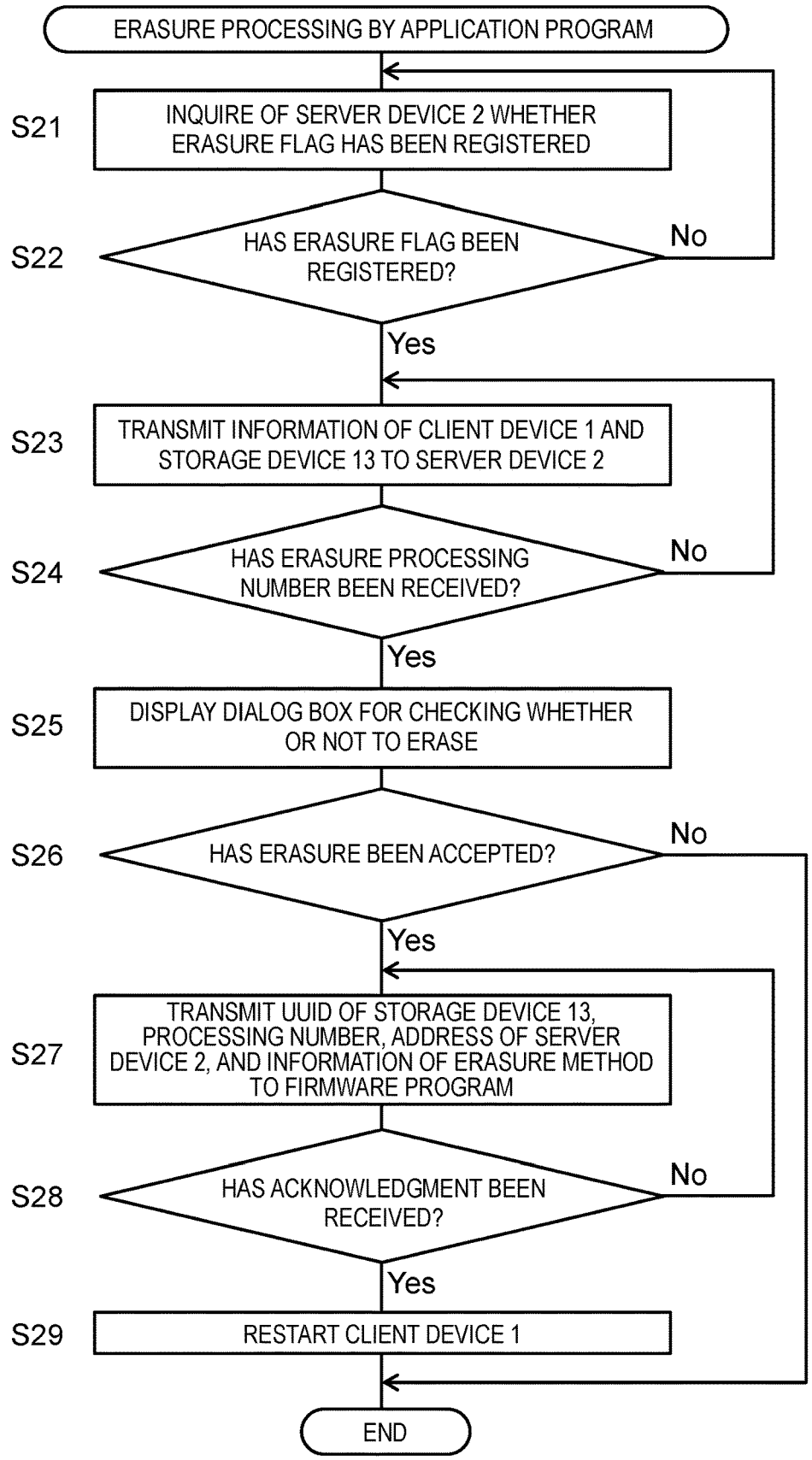
FIG. 10 is a flowchart showing erasure processing by erasure application program 70 executed by processor 11 of FIG. 2.
Figure 11:
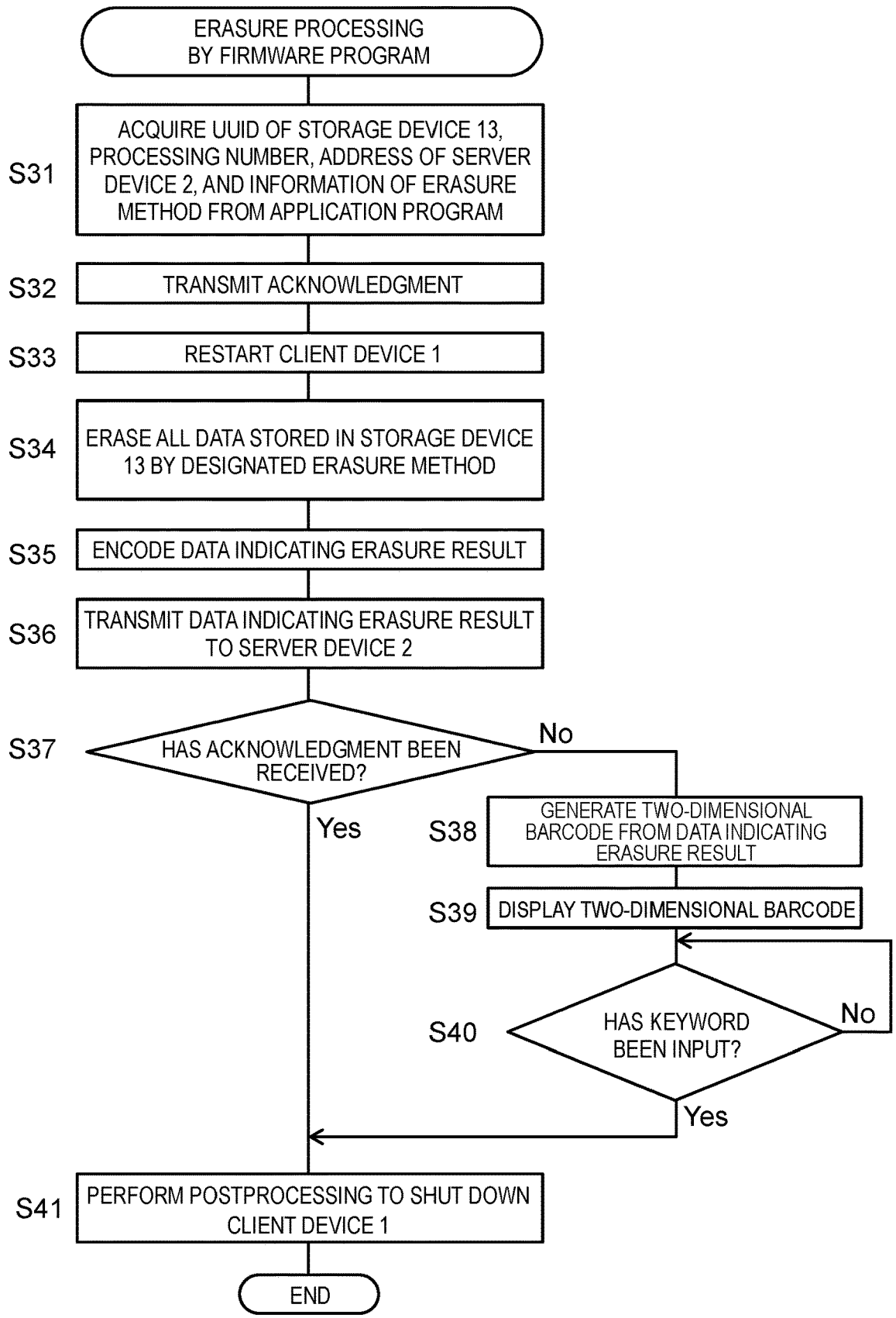
FIG. 11 is a flowchart showing erasure processing by firmware program 50 executed by processor 11 of FIG. 2.
Figure 12:
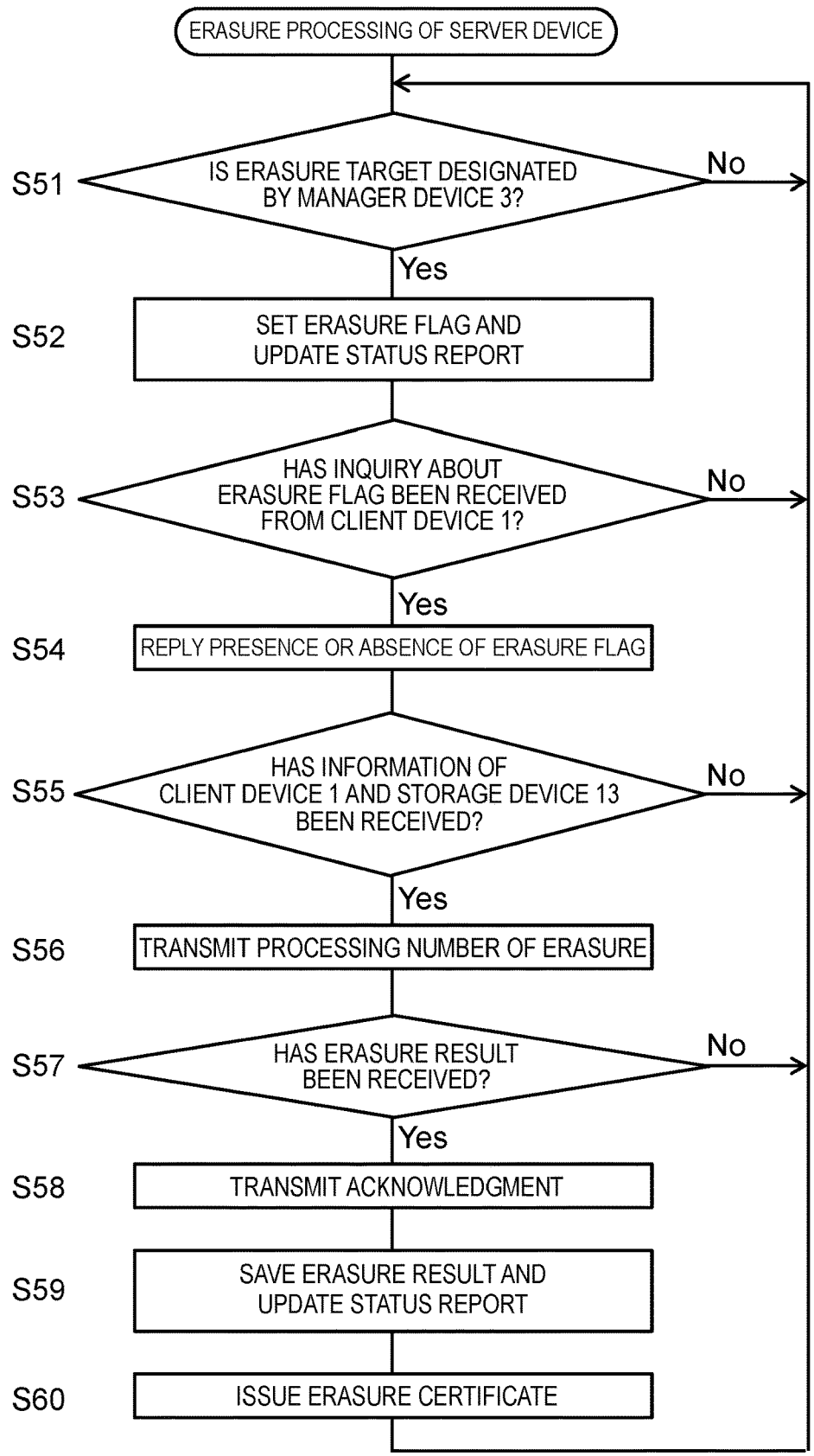
FIG. 12 is a flowchart showing erasure processing of server device 2 executed by processor 21 of FIG. 3.

FIG. 10 is a flowchart showing erasure processing by erasure application program 70 executed by processor 11 of FIG. 2. FIG. 11 is a flowchart showing erasure processing by firmware program 50 executed by processor 11 of FIG. 2. FIG. 12 is a flowchart showing erasure processing of server device 2 executed by processor 21 of FIG. 3.

First, in step S51 of FIG. 12, server device 2 determines whether or not storage device 13 of an erasure target has been designated by manager device 3. When YES, the process proceeds to step S52, and when NO, the process repeats step S51. In step S52, server device 2 sets an erasure flag in storage device 13 designated as the erasure target in management table 22a, and updates the status report of storage device 13.

After client device 1 is started up, erasure application program 70 is started up automatically or manually.

In step S21 of FIG. 10, core controller 71 of client device 1 uses communication device 15 to inquire of server device 2 whether or not an erasure flag has been registered for storage device 13 of client device 1 executing the erasure processing of FIG. 10 in management table 22a of server device 2.

In step S53 of FIG. 12, server device 2 determines whether or not an inquiry of the erasure flag has been received from client device 1. When YES, the process proceeds to step S54, and when NO, the process returns to step S51. In step S54, server device 2 replies the presence or absence of the erasure flag to client device 1.

In step S22 of FIG. 10, core controller 71 of client device 1 determines whether or not the erasure flag has been registered for storage device 13 of client device 1 executing the erasure processing of FIG. 10 in management table 22a of server device 2. When YES, the process proceeds to step S23, and when NO, the process returns to step S21.

In step S23, core controller 71 of client device 1 transmits the information of client device 1 and the information of storage device 13 to server device 2 by using communication device 15.

In step S55 of FIG. 12, server device 2 determines whether or not the information of client device 1 and the information of storage device 13 have been received. When YES, the process proceeds to step S56, and when NO, the process returns to step S51.

When the information of client device 1 and the information of storage device 13 received by server device 2 match the information of client device 1 and the information of storage device 13 registered in management table 22a by the registration processing of FIG. 7, in step S56, server device 2 generates and transmits, to client device 1, a processing number for storage device 13 of client device 1 executing the erasure processing of FIG. 10. In a case of failing to specify storage device 13 based on the information of client device 1 and the information of storage device 13 having been received, or in a case where the erasure flag is not set, server device 2 returns an error as a response. Even when storage device 13 can be specified based on the information of client device 1 and the information of storage device 13 having been received, in a case where the erasure flag is not set or the identification information of storage device 13 is different, the fact of being different may be returned as a response. In this case, since the processing number is not returned, client device 1 cannot erase the data stored in the storage device.

In step S24 of FIG. 10, core controller 71 of client device 1 determines whether or not the processing number for erasure has been received in response to the information transmitted in step S23. When YES, the process proceeds to step S25, and when NO, the process returns to step S23.

In step S25, core controller 71 of client device 1 displays, on display device 16, a dialog box for checking whether or not to erase the data stored in storage device 13. By using input device 17, in accordance with the dialog box, the user of client device 1 inputs whether or not to erase the data stored in storage device 13. Core controller 71 acquires, via input device 17, whether or not to erase the data stored in storage device 13.

In step S26, core controller 71 of client device 1 determines whether or not the erasure of the data stored in storage device 13 has been accepted by the user. When YES, the process proceeds to step S27, and when NO the process ends.

In step S27, core controller 71 of client device 1 sends, to firmware program 50, the UUID of storage device 13, the processing number, an address of server device 2, and the information of the erasure method. The information of the erasure method includes, for example, secure erase (an example of command erasure), overwrite three times erasure (overwrite content: any of "0", "1", and random value), overwrite one time erasure (overwrite content: any of "0", "1", and random value), and failure.

Core controller 51 of firmware program 50 stores, in storage device 14, the UUID of storage device 13, the processing number, the address of server device 2, and the information of the erasure method having been acquired from erasure application program 70 (see step S31 of FIG. 11). When acquiring and storing the UUID of storage device 13, the processing number, the address of server device 2, and the information of the erasure method, core controller 51 transmits an acknowledgment signal to erasure application program 70 (see step S32 of FIG. 11).

In step S28 of FIG. 10, core controller 71 of client device 1 determines whether or not an acknowledgment signal has been received from firmware program 50. When YES, the process proceeds to step S29, and when NO, the process returns to step S27.

In step S29, core controller 71 of client device 1 restarts client device 1 by sending a control signal to power supply manager 62 of operating system 60.

Steps S31 to S33 of FIG. 11 correspond to steps S27 to S29 of FIG. 10.

In step S31 of FIG. 11, core controller 51 of client device 1 stores, in storage device 14, the UUID of storage device 13, the processing number, the address of server device 2, and the information on the erasure method acquired from erasure application program 70.

In step S32, when acquiring and storing the UUID of storage device 13, the processing number, the address of server device 2, and the information of the erasure method, core controller 51 of client device 1 transmits an acknowledgment signal to erasure application program 70.

In step S33, erasure application program 70 restarts client device 1.

After restarting, firmware program 50 continues the erasure processing of FIG. 11 without invoking operating system 60.

In step S34, using erasure controller 52, core controller 51 of client device 1 erases all the data stored in storage device 13 by the designated erasure method. Erasure controller 52 may perform erasure (command erasure) of data using a secure erase command of the storage device. After completion of the erasure, core controller 51 stores, in storage device 14, data indicating the erasure result including the erasure start time, the erasure end time, and the erasure method.

In step S35, core controller 51 of client device 1 reads data indicating an erasure result from storage device 14, and, by a predetermined encoding method, encodes data indicating the erasure result using data encoder 53. Core controller 51 stores the encoded data in storage device 14.

The encoding of the data indicating the encoded erasure result is executed, for example, in the following steps.
(1) These parameters for serially arraying the UUID, the processing number, the erasure start time, the erasure end time, and the erasure method may be arrayed in the CSV format, for example.
(2) A character string related to the parameter of step (1) is converted into a half-width character string such as BCD. Here, a character string may be added.
(3) A hash value of the character string of step (2) is calculated.
(4) The character string of step (2) and the hash value of step (3) are converted into a format that can be transmitted via communication line 6. If necessary, for example, URL encoding is performed.
(5) The data of step (4) is transmitted using the address of server device 2 as a destination.

In step S36, core controller 51 of client device 1 reads the data indicating the erasure result having been encoded from storage device 14, and uses communication device 15 to transmit, to server device 2, the data indicating the erasure result having been encoded.

In step S57 of FIG. 12, server device 2 determines whether or not the erasure result has been received from client device 1. When YES, the process proceeds to step S58, and when NO, the process returns to step S51.

In step S58, server device 2 transmits an acknowledgment signal for the erasure result to client device 1.

In step S37 of FIG. 11, core controller 51 of client device 1 determines whether or not the acknowledgment signal has been received from server device 2. When YES, the process proceeds to step S41, and when NO, the process proceeds to step S38.

In step S38, core controller 51 of client device 1 reads the data indicating the erasure result from storage device 14, and, using two-dimensional barcode generator 54, generates a two-dimensional barcode from the data indicating the erasure result. Core controller 51 stores the generated two-dimensional barcode in storage device 14.

In step S39, core controller 51 of client device 1 reads the two-dimensional barcode from storage device 14 and displays the two-dimensional barcode on display device 16.

Figure 13:
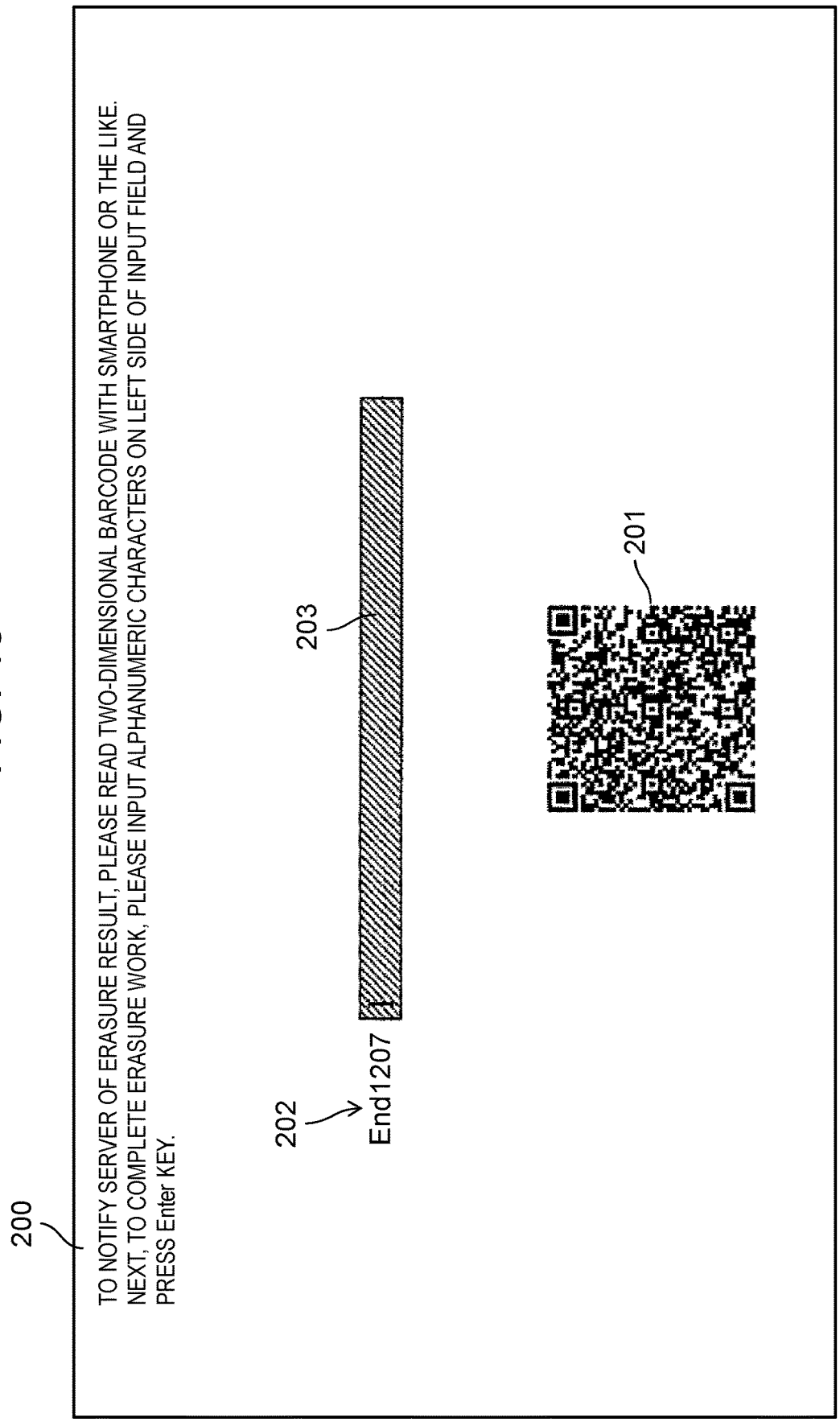
FIG. 13 is a view illustrating content displayed on display device 16 of client device 1 in step S39 of FIG. 11.

FIG. 13 is a view illustrating the content displayed on display device 16 of client device 1 in step S39 of FIG. 11. Display screen 200 displayed on display device 16 includes, for example, two-dimensional barcode 201, keyword 202, and input field 203. The user can capture two-dimensional barcode 201 using camera 48 of user terminal device 4, and operate user terminal device 4 so that processor 41 of user terminal device 4 decodes two-dimensional barcode 201 to extract data indicating the erasure result, and transmits this data to server device 2.

In step S40 of FIG. 11, core controller 51 of client device 1 determines whether or not the keyword displayed on display device 16 has been input from input device 17. When YES, the process proceeds to step S41, and when NO, the process repeats step S40. Here, an image of two-dimensional barcode 201 may be prevented from being erased by simple processing such as power off. For example, core controller 51 may display a message prompting to input a predetermined keyword 202 (in the example of FIG. 13, "End1207") on display device 16 together with two-dimensional barcode 201. When keyword 202 is input into input field 203 and an enter key is pressed, the processing proceeds to step S41. When a different keyword is input or when the power switch is operated, the same screen is redisplayed.

According to the processing of FIG. 11, the erasure result is first, in step S36, transmitted from client device 1 to server device 2 via communication line 6. When a failure or the like occurs in communication line 6, that is, when an acknowledgment signal for the erasure result has not been received in step S37, the erasure result is transmitted to server device 2 via user terminal device 4 by executing steps S38 to S39. Therefore, in step S57 of FIG. 12, server device 2 may receive the erasure result via communication line 6 from client device 1, or may receive the erasure result via user terminal device 4.

With reference to FIG. 12, after executing step S58, server device 2 saves in step S59 the erasure result into management table 22a and updates the status report.

In step S60, server device 2 issues an erasure certificate based on the erasure result.

In step S41 of FIG. 11, core controller 51 of client device 1 performs postprocessing and shuts down client device 1.

Figure 14:
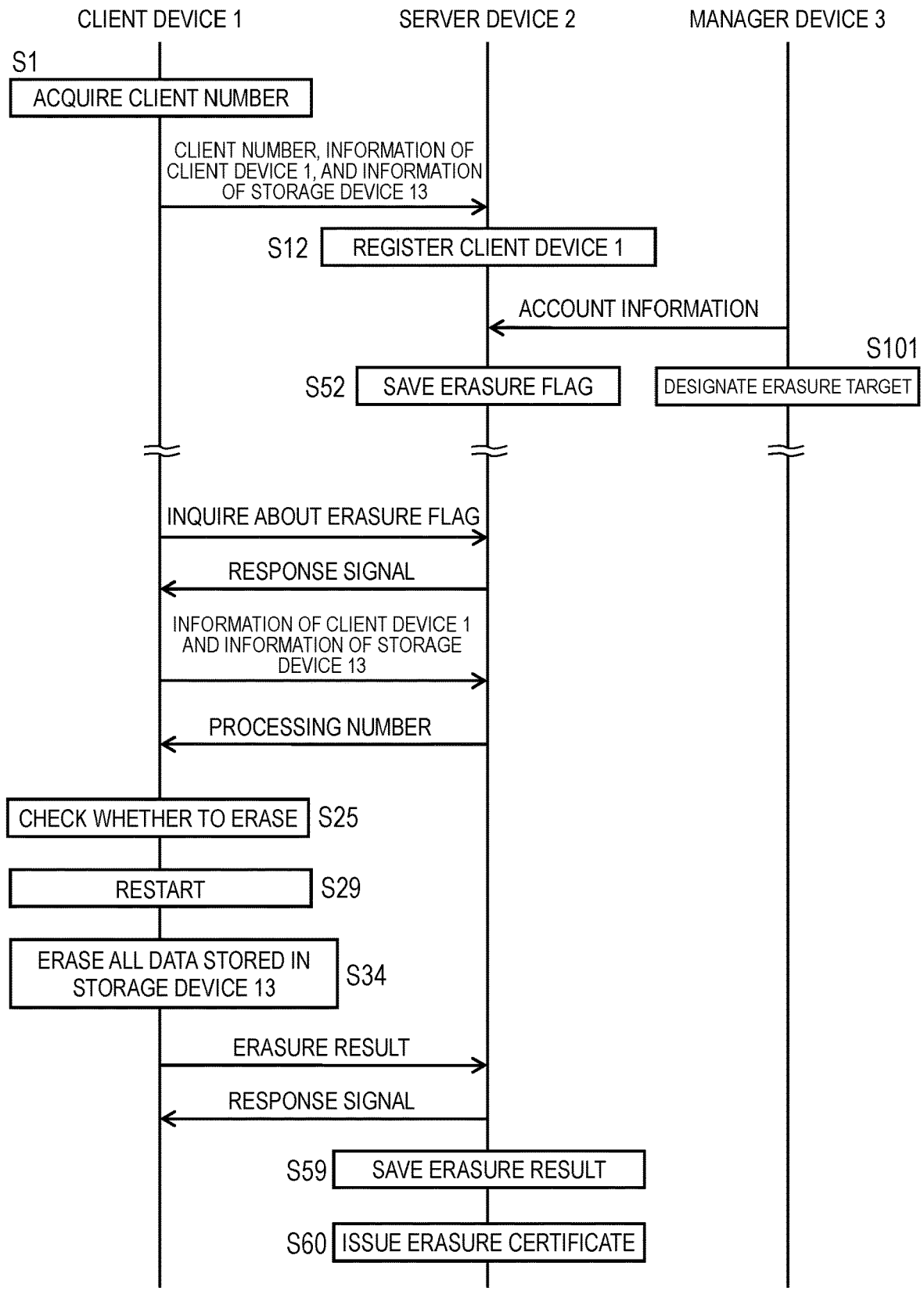
FIG. 14 is a sequence diagram illustrating an operation of system 100 when transmission of erasure result information via communication line 6 has been successful in system 100 of FIG. 1.
Figure 15:
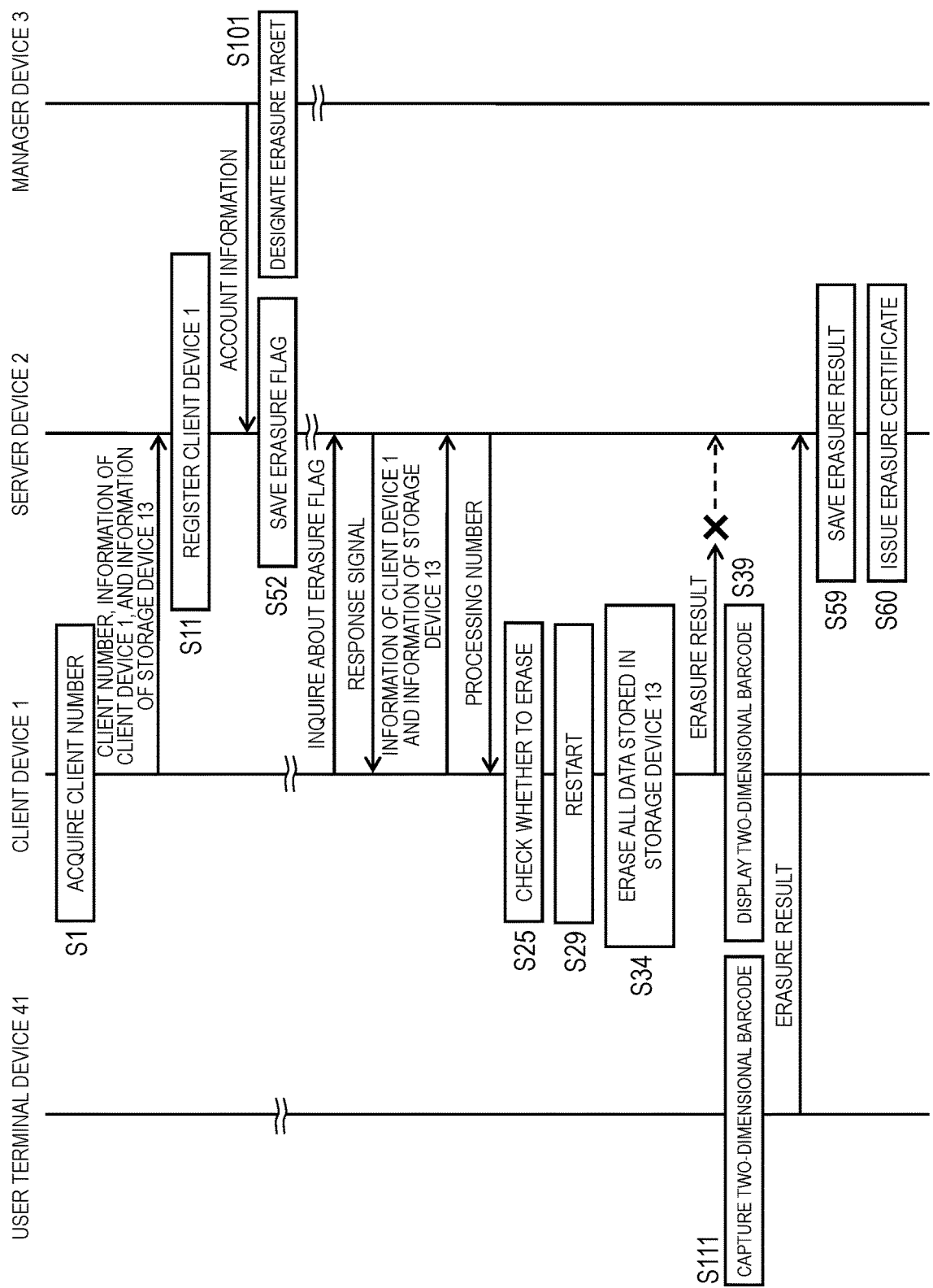
FIG. 15 is a sequence diagram illustrating an operation of system 100 when transmission of erasure result information via communication line 6 has failed in system 100 of FIG. 1.

FIG. 14 is a sequence diagram illustrating the operation of system 100 when transmission of erasure result information via communication line 6 has been successful in system 100 of FIG. 1. FIG. 15 is a sequence diagram illustrating the operation of system 100 when transmission of erasure result information via communication line 6 has failed in system 100 of FIG. 1.

For simplification of illustration, FIGS. 14 and 15 illustrate only main steps among the steps described with reference to FIGS. 7, 8, and 10 to 12, and omit others.

With reference to FIG. 14, client device 1 acquires the client number from the user in step S1. Next, client device 1 transmits the client number, the information of client device 1, and the information of storage device 13 to server device 2.

In step S12, server device 2 registers storage device 13 of client device 1 as a new management target based on the client number, the information of client device 1, and the information of storage device 13.

Thereafter, manager device 3 transmits the account information to server device 2 to log in to server device 2, and, in step S101, designates storage device 13 of the erasure target, that is, storage device 13 from which the stored data should be erased.

In step S52, server device 2 saves the erasure flag into management table 22a so as to correspond to storage device 13 designated in step S101.

Thereafter, client device 1 periodically inquires of server device 2 whether or not the erasure flag has been set in management table 22a in response to storage device 13 of client device 1. In response to the inquiry about the erasure flag, when a response signal indicating that the erasure flag has been set in management table 22a is received from server device 2, client device 1 transmits the information of client device 1 and the information of storage device 13 to server device 2. When the information of client device 1 and the information of storage device 13 received by server device 2 match the information of client device 1 and the information of storage device 13 registered in management table 22a, server device 2 generates and transmits, to client device 1, a processing number for storage device 13 of client device 1.

Thereafter, in step S25, client device 1 displays, on display device 16, a dialog box for checking whether or not to erase the data stored in storage device 13. In a case where the erasure of the data stored in storage device 13 is accepted by the user, client device 1 is restarted in step S29. Thereafter, in step S34, client device 1 erases all the data stored in storage device 13.

After completion of the erasure, client device 1 transmits the erasure result information to server device 2. When a response signal to the erasure result information is received from server device 2 within a predetermined timeout period, client device 1 ends the processing.

In step S59, server device 2 stores, in management table 22a, the erasure result included in an erasure result signal. In step S60, server device 2 issues an erasure certificate based on the erasure result included in the erasure result signal.

On the other hand, as illustrated in FIG. 15, in a case where the erasure result information transmitted by client device 1 has not reached server device 2, or when a response signal to the erasure result information has not been received, client device 1 displays a two-dimensional barcode on display device 16 in step S39.

In step S111, the user of client device 1 captures the two-dimensional barcode displayed on display device 16 of client device 1 using user terminal device 4. Processor 41 of user terminal device 4 decodes the two-dimensional barcode, extracts data indicating the erasure result, and transmits this data to server device 2. Hereinafter, steps S59 to S60 of FIG. 15 are similar to the corresponding steps of FIG. 14.

[Erasure Certificate]

For example, when data stored in the storage device is erased using erasure software or an erasure process authenticated by a third-party certifier such as Association of Data Erase Certification (ADEC), a certificate indicating that proper erasure of data has been executed can be issued. The certificate includes, for example, the following information.
(1) Information of Client Device 1
  Manufacturer
  Model
  Serial number
(2) Information of Storage Device 13
  Manufacturer
  Model
  Serial number
  Capacity
(3) Erasure Information
  Erasure business operator information (business operator ID, business operator name, and rating)
  Erasure software information (vendor name, software name, authentication number, and erasure method)
  Erasure execution date and time (erasure start time and erasure end time)
  Erasure result The information of client device 1 and the information of storage device 13 are transmitted from client device 1 to server device 2 by erasure application program 70 as mentioned earlier. In the erasure information, the business operator ID, the business operator name, the vendor name, and the software name need to be applied to a certifier in advance to be authenticated. When the erasure software is authenticated, an authentication number is issued. The erasure execution date and time and the erasure result are sent from client device 1 to server device 2 by firmware program 50. Thus, since the information necessary for issuing the erasure certificate can be automatically sent from client device 1 to server device 2, the erasure certificate can be easily issued.

Summary

As described above, according to the system according to the first exemplary embodiment, the manager accesses server device 2 to set an erasure flag indicating that the data stored in storage device 13 of each client device 1 should be erased, and thereafter, the client device inquires of server device 2 about the presence or absence of the erasure flag without transmitting an erasure command or the like from server device 2 to client device 1. This makes it possible to specify, without an error, and easily set storage device 13 of the erasure target. A signal is not transmitted from server device 2 to client device 1 when erasure is started, and the user of client device 1 only needs to connect client device 1 to communication line 6 when erasure is started. Therefore, data can be erased as an accommodation to the user. This makes it possible to specify, without an error, data stored in storage device 13 and easily erase the data.

Performing the erasure processing not only by erasure application program 70 but also by a combination of erasure application program 70 and firmware program 50 has the following advantages. Erasure application program 70 executed on operating system 60 exists in storage device 13. Similarly, the UEFI application program executed on firmware program 50 exists in storage device 13. Therefore, when the data stored in storage device 13 is erased by erasure application program 70 or the UEFI application program, a region of storage device 13 where the program exists cannot be erased. Erasure application program 70 or the UEFI application program cannot communicate with server device 2 via the communication line after completion of erasure of data. Since erasure application program 70 or the UEFI application program cannot operate after completion of erasure of data, information (e.g., the erasure start time, the erasure end time, and the erasure method) indicating the erasure result cannot be acquired. According to system 100 according to the first exemplary embodiment, by executing firmware program 50, it is possible to erase all data stored in storage device 13, communicate with server device 2 via the communication line after completion of erasure of data, and acquire information indicating the erasure result after completion of erasure of data.

For example, it is conceivable to commission erasure of data stored in storage device 13 to a contractor. However, there is a security risk in transferring, to the business place of the contractor, the client device including a storage device from which the stored data should be erased. Use of a delivery form with high security increases the cost. It is necessary to perform a large amount of work for erasure and subsequent check. It takes a long time, for example, half a day to erase data. According to system 100 according to the first exemplary embodiment, since the data stored in storage device 13 can be erased without moving client device 1, the data can be easily erased with high security and low cost.

Here, some use examples of the system according to the first exemplary embodiment will be described.

Use Example 1

First, consider a case of discarding all client devices 1 corresponding to a certain group of users (e.g., one section of a company) but not managing these client devices 1 as a group. Each user registers corresponding client device 1 in server device 2. The manager of the system checks all client devices 1 to be discarded (for all members of the group) and sets an erasure flag in management table 22a of server device 2. Thereafter, each user erases data stored in storage device 13. The manager checks that the erasure has been completed. If successfully checked, the erasure can be certified, and on the other hand, if failed to be checked, the user is prompted to erase the data. The manager acquires an ADEC erasure certificate as needed.

Use Example 2

Next, consider a case of discarding all client devices 1 corresponding to a certain group of users (e.g., one section of a company) and managing these client devices 1 as a group. Most of the tasks of the manager are undertaken by a responsible person of the group (e.g., section manager). The manager sets a group. Each user sets and registers the group of corresponding client device 1 in server device 2. The responsible person checks all client devices 1 to be discarded (for all members of the group), and sets an erasure flag in management table 22a of server device 2. Thereafter, each user erases data stored in storage device 13. The responsible person checks that the erasure has been completed. If successfully checked, the erasure can be certified, and on the other hand, if failed to be checked, the user is prompted to erase the data. The responsible person requests issuance of an ADEC erasure certificate. The manager acquires an ADEC erasure certificate.

Use Example 3

Consider a case of discarding all client devices 1 corresponding to a certain group of users (e.g., one section of a company) and managing these client devices 1 as a group. The manager sets a group. Each user sets and registers the group of corresponding client device 1 in server device 2. The responsible person checks all client devices 1 to be discarded (for all members of the group) and contacts the manager. The manager sets an erasure flag in management table 22a of server device 2. Thereafter, each user erases data stored in storage device 13. The responsible person checks that the erasure has been completed. If successfully checked, the erasure can be certified, and on the other hand, if failed to be checked, the user is prompted to erase the data. The responsible person requests issuance of an ADEC erasure certificate. The manager acquires an ADEC erasure certificate.

In any of use examples 1 to 3, it is possible to specify, without an error, data stored in storage device 13 and easily erase the data.

Effects of First Exemplary Embodiment

According to one aspect of the present disclosure, client device 1 (an example of the electronic apparatus) includes storage device 13 (an example of the first storage device), communication device 15, and processor 11. Processor 11 registers client device 1 into server device 2 by using communication device 15 to transmit, to server device 2, a first signal including identification information for uniquely identifying storage device 13. Using communication device 15, processor 11 transmits, to server device 2, a second signal including identification information of storage device 13, the second signal inquiring whether or not it is registered in server device 2 that the data stored in storage device 13 should be erased. When receiving, from server device 2, a third signal instructing erasure of the data stored in storage device 13 by using communication device 15, processor 11 erases the data stored in storage device 13. The third signal is transmitted from server device 2 to client device 1 when server device 2 determines that the identification information of storage device 13 included in the second signal matches the identification information of storage device 13 included in the first signal and it is registered in server device 2 that the data stored in storage device 13 should be erased.

This can specify, without an error, data stored in a storage device and easily erase the data.

According to one aspect of the present disclosure, storage device 13 may store data including an operating system, an application program, and user data. Client device 1 may further include storage device 14 (an example of a second storage device) that stores a firmware program. Processor 11 may erase all data stored in storage device 13 by executing the firmware program.

This can erase all data stored in the storage device including the operating system.

According to one aspect of the present disclosure, by executing the firmware program after the erasure of all data stored in storage device 13 is completed, processor 11 may use communication device 15 to transmit, to server device 2, a fourth signal including erasure completion information indicating that the erasure of all the data stored in storage device 13 has been completed.

Due to this, after all the data stored in the storage device including the operating system have been erased, information necessary for creation of the erasure certificate can be transmitted to the server device.

According to one aspect of the present disclosure, client device 1 may further include display device 16. When having not received an acknowledgment signal to the fourth signal from server device 2, by executing the firmware program, processor 11 may display, on display device 16, two-dimensional barcode 201 (an example of a first two-dimensional barcode) including erasure completion information indicating that the erasure of all the data stored in storage device 13 has been completed.

Due to this, even when communication with the server device is not possible, information necessary for creation of the erasure certificate can be acquired.

According to one aspect of the present disclosure, the second signal may include a sixth signal inquiring of server device 2 whether or not it is registered in server device 2 that the data stored in storage device 13 should be erased, and a seventh signal including identification information of storage device 13. When using communication device 15 to transmit the sixth signal to server device 2, and using communication device 15 to receive, from server device 2, an eighth signal indicating that it is registered in server device 2 that the data stored in storage device 13 should be erased, processor 11 may transmit the seventh signal to server device 2 by using communication device 15.

This can avoid extra communication including the identification information of storage device 13, and can reduce the communication data amount.

According to one aspect of the present disclosure, the identification information of storage device 13 may include at least some of a manufacturer of client device 1, a model of client device 1, a serial number of client device 1, a UUID of client device 1, a manufacturer of storage device 13, a model of storage device 13, a serial number of storage device 13, a UUID of storage device 13, and a capacity of storage device 13.

This makes it possible to identify storage device 13 of client device 1.

According to one aspect of the present disclosure, a system including the plurality of client devices 1 described above and server device 2 is provided.

This can specify, without an error, data stored in a storage device and easily erase the data.

According to one aspect of the present disclosure, server device 2 may acquire, from client device 1, erasure completion information indicating that the erasure of all the data stored in storage device 13 has been completed, and, based on the erasure completion information, issue an erasure certificate certifying that the erasure of all the data stored in storage device 13 has been completed.

This makes it possible to issue the erasure certificate certifying that the erasure of all the data stored in the storage device has been completed.

According to one aspect of the present disclosure, the third signal may include a processing number issued to storage device 13 of each of the plurality of client devices 1 registered in server device 2 that the data stored in storage device 13 should be erased. The erasure completion information may include the processing number, a UUID of storage device 13, an erasure start time, an erasure completion time, and an erasure method.

This makes it possible to issue the erasure certificate certifying that the erasure of all the data stored in the storage device has been completed.

According to one aspect of the present disclosure, the method for erasing data stored in storage device 13 of client device 1 includes registering client device 1 into server device 2 by transmitting, from client device 1 to server device 2, the first signal including identification information for uniquely identifying storage device 13. The present method includes transmitting, from client device 1 to server device 2, a second signal including identification information of storage device 13, the second signal inquiring whether or not it is registered in server device 2 that the data stored in storage device 13 should be erased. The present method includes erasing the data stored in storage device 13 when a third signal instructing erasure of the data stored in storage device 13 is received from server device 2. The third signal is transmitted from server device 2 to client device 1 when server device 2 determines that the identification information of storage device 13 included in the second signal matches the identification information of storage device 13 included in the first signal and it is registered in server device 2 that the data stored in storage device 13 should be erased.

This can specify, without an error, data stored in a storage device and easily erase the data.

Second Exemplary Embodiment

There is a case of being required to verify that data has been erased after data stored in the storage device of the electronic apparatus has been erased. Here, in order to erase data, similarly to that a fixed bit value (such as a zero value) or a random bit value needs to be written to an entire storage region of the storage device, verification of the erasure generally needs to read a bit value of the entire storage region of the storage device. For example, in a case of verifying the erasure result by performing overwrite three times erasure for an SSD of 1 TB, it takes about 2 hours (40 minutes×3) to erase, and it takes another 40 minutes to verify the erasure. For this reason, it takes a very long time until the result of the erasure and the verification is found, causing the user and the manager of the electronic apparatus to wait.

The second exemplary embodiment provides an electronic apparatus and a system that do not cause the user and the manager to wait so much even when performing verification of the erasure, and that are less likely to decrease usability than in a case of not performing verification of the erasure.

Configuration of Second Exemplary Embodiment

The system according to the second exemplary embodiment is configured similarly to system 100 including client device 1, server device 2, manager device 3, and user terminal device 4 according to the first exemplary embodiment described with reference to FIGS. 1 to 6.

With reference to the functional block diagram of FIG. 6, in the system according to the second exemplary embodiment, erasure controller 52, data encoder 53, and two-dimensional barcode generator 54 of firmware program 50 are configured to perform the following operations in addition to the operations described earlier. Erasure controller 52 further controls verification that data stored in storage device 13 has been erased. Data encoder 53 further encodes, by a predetermined encoding method, verification result information indicating whether or not to have succeeded in verification that the data stored in storage device 13 has been erased. Two-dimensional barcode generator 54 further generates a two-dimensional barcode including verification result information (including verification completion information in a case of having succeeded in the verification) indicating whether or not to have succeeded in verification that the data stored in storage device 13 has been erased.

Hereinafter, the operations of client device 1, server device 2, manager device 3, and user terminal device 4 will be described.

Operation of Second Exemplary Embodiment

Figure 16:
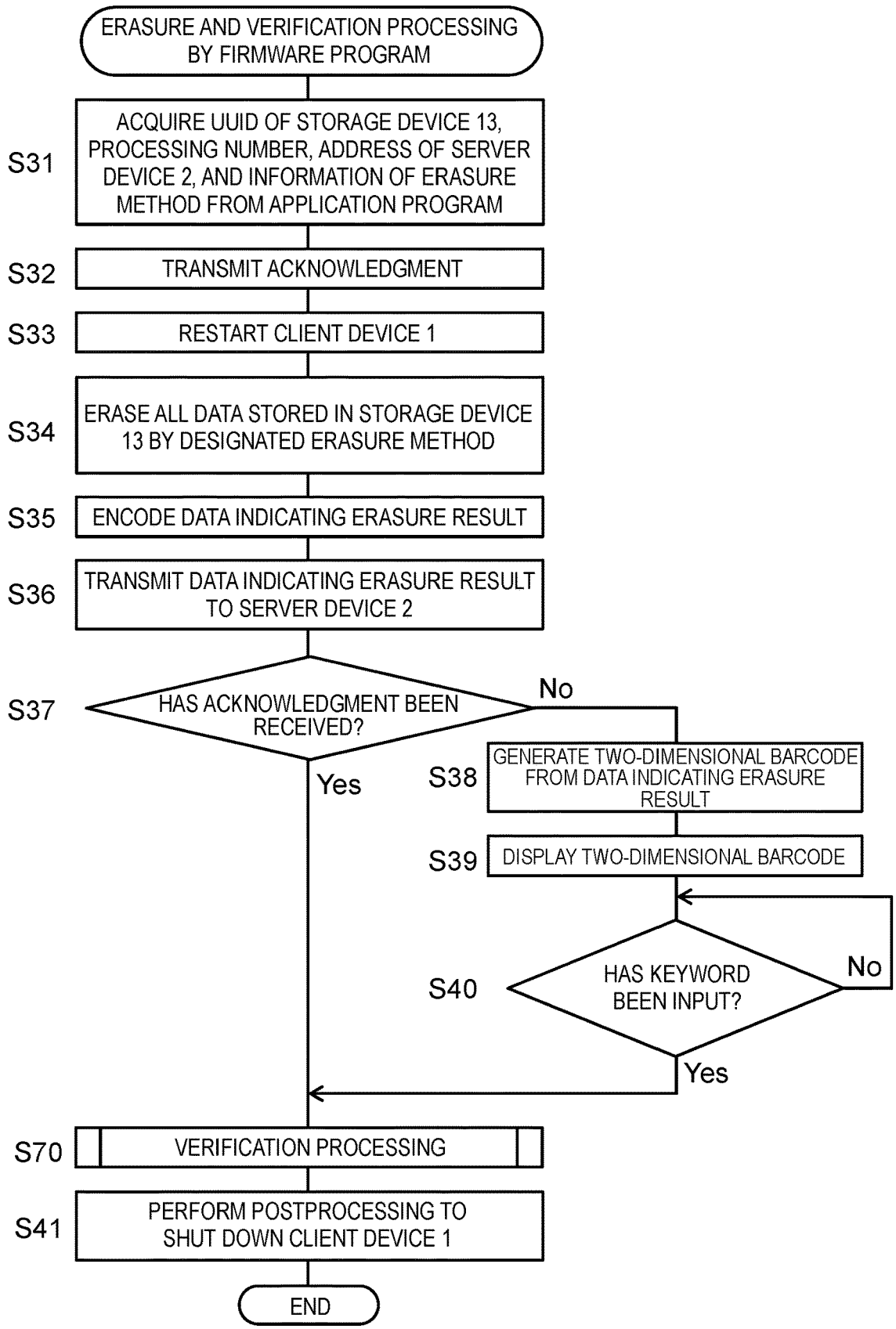
FIG. 16 is a flowchart showing erasure and verification processing by firmware program 50 executed by processor 11 of client device 1, which are the operation of a system according to a second exemplary embodiment.
Figure 17:
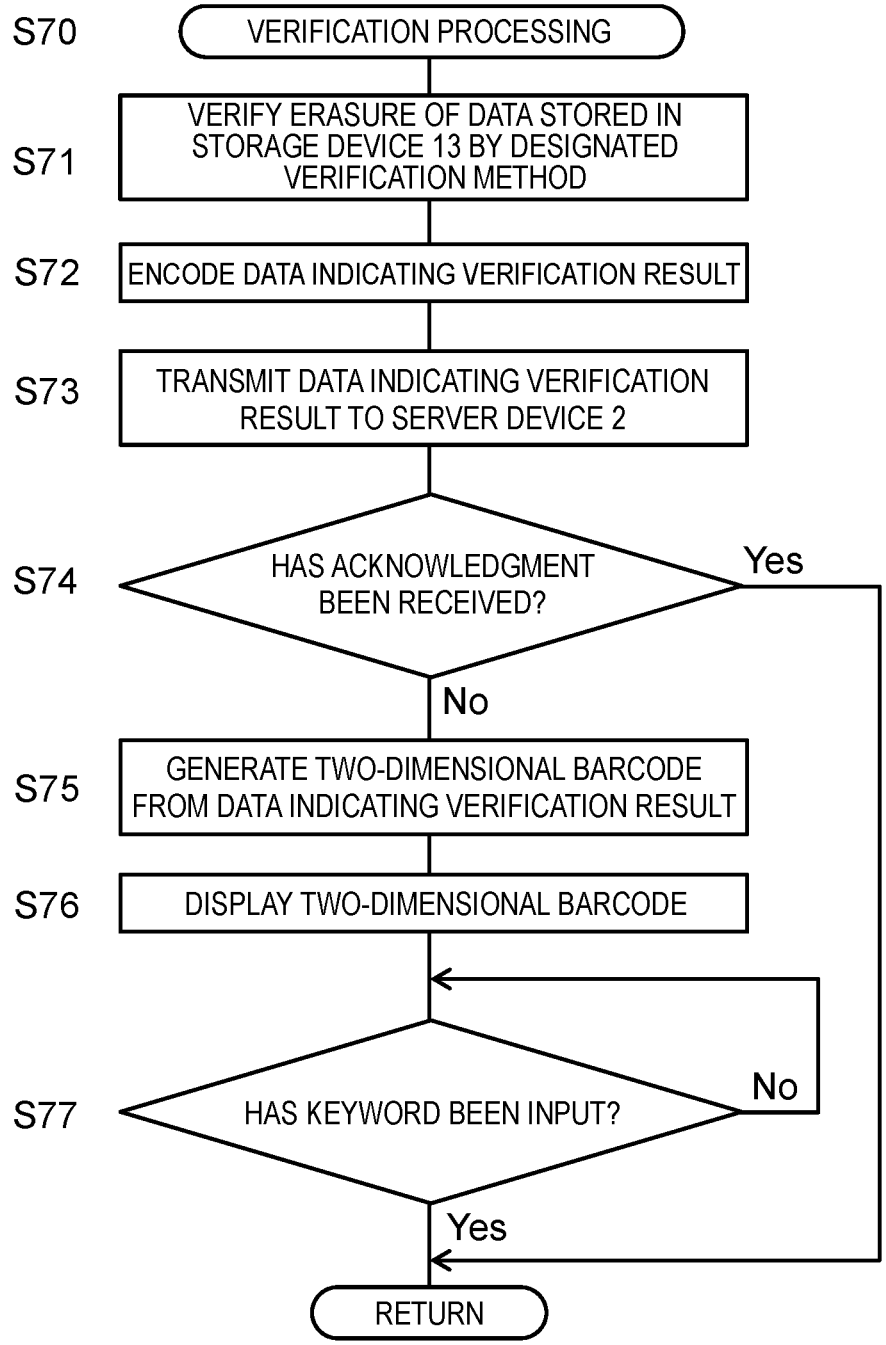
FIG. 17 is a flowchart showing a subroutine of step S70 (verification processing) of FIG. 16.
Figure 18:
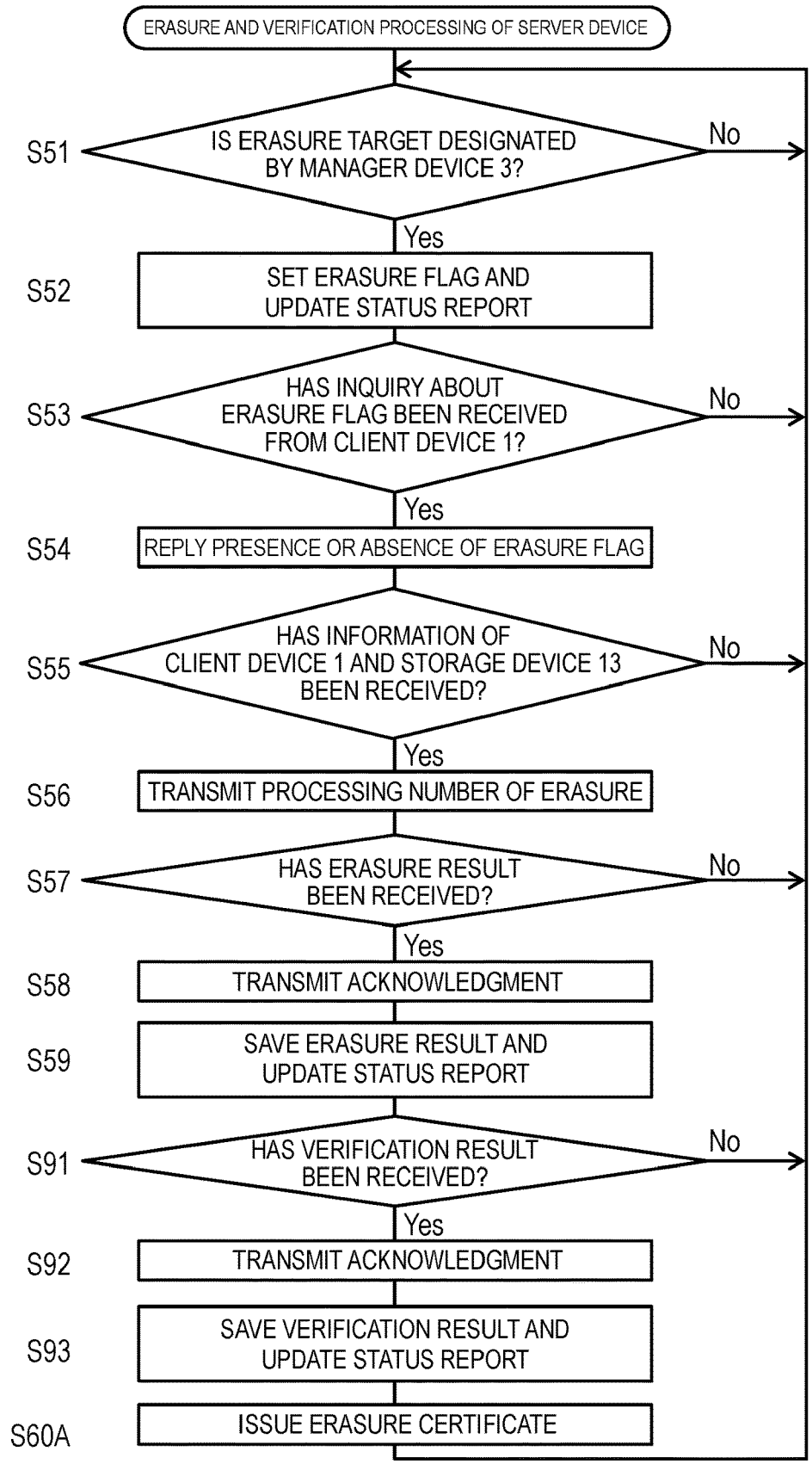
FIG. 18 is a flowchart showing erasure and verification processing of server device 2 executed by processor 21, which are the operation of the system according to the second exemplary embodiment.

FIG. 16 is a flowchart showing erasure and verification processing by firmware program 50 executed by processor 11 of client device 1, which are the operation of the system according to the second exemplary embodiment. FIG. 17 is a flowchart showing a subroutine of step S70 (verification processing) of FIG. 16. FIG. 18 is a flowchart showing erasure and verification processing of server device 2 executed by processor 21, which are the operation of the system according to the second exemplary embodiment.

The processing of FIG. 16 includes the verification processing of step S70 in addition to each step of FIG. 11, and here, it is verified that the data stored in storage device 13 has been erased. The processing of FIG. 18 further includes steps S91 to S93 in addition to each step of FIG. 12.

When YES in step S37 of FIG. 16 or when YES in step S40, core controller 51 of client device 1 proceeds to the verification processing of step S70.

In step S71 of FIG. 17, core controller 51 of client device 1 verifies that the data stored in storage device 13 has been erased by the designated verification method using erasure controller 52. For example, in a case where data is erased by writing a zero value into a storage region of storage device 13, verification of the erasure may be performed by reading a bit value in the storage region of storage device 13 and checking that each bit is a zero value. After completion of the verification, core controller 51 stores data indicating the verification result in storage device 14.

Figure 19:
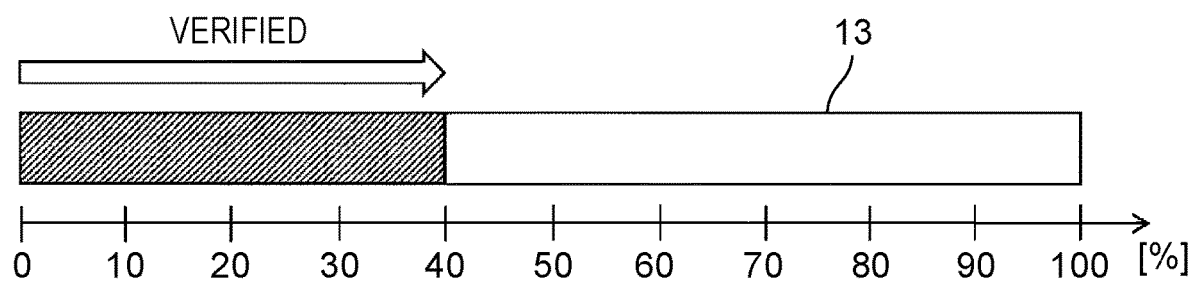
FIG. 19 is a schematic diagram for explaining a first verification method of storage device 13.

FIG. 19 is a schematic diagram for explaining the first verification method of storage device 13. Verification of the erasure may be performed by reading and checking bit values of the entire storage region of storage device 13.

Figure 20:
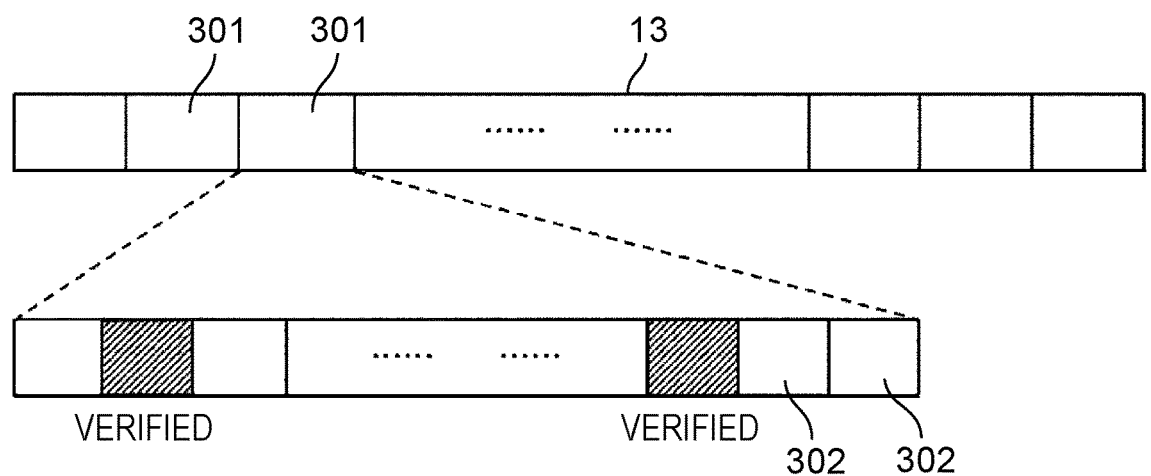
FIG. 20 is a schematic diagram for explaining a second verification method of storage device 13.

FIG. 20 is a schematic diagram for explaining the second verification method of storage device 13. Verification of the erasure may be performed by reading and checking bit values of a predetermined number of partial regions randomly extracted from a plurality of partial regions obtained by dividing the entire storage region of storage device 13. In the example of FIG. 20, the entire storage region of storage device 13 includes a plurality of (e.g., 1000) middle regions 301, and middle regions 301 each include a plurality of (e.g., 20) small regions 302. Verification of the erasure may be performed by reading and checking bit values of at least some (e.g., randomly extracted two) of small regions 302 in each middle region 301.

In step S72 of FIG. 17, core controller 51 of client device 1 reads data indicating a verification result from storage device 14, and, using data encoder 53, encodes the data indicating the verification result by a predetermined encoding method. Core controller 51 stores the encoded data in storage device 14.

In step S73, core controller 51 of client device 1 reads the data indicating the verification result encoded from storage device 14, and uses communication device 15 to transmit, to server device 2, the data indicating the encoded verification result.

In step S91 of FIG. 18, server device 2 determines whether or not a verification result has been received from client device 1. When YES, the process proceeds to step S92, and when NO, the process returns to step S51.

In step S92, server device 2 transmits an acknowledgment signal for the verification result to client device 1.

In step S74 of FIG. 17, core controller 51 of client device 1 determines whether or not an acknowledgment signal has been received from server device 2. When YES, the process proceeds to step S41 of FIG. 16, and when NO, the process proceeds to step S75 of FIG. 17.

In step S75, core controller 51 of client device 1 reads the data indicating the verification result from storage device 14, and, using two-dimensional barcode generator 54, generates a two-dimensional barcode from the data indicating the verification result. Core controller 51 stores the generated two-dimensional barcode in storage device 14.

In step S76, core controller 51 of client device 1 reads the two-dimensional barcode from storage device 14, and displays the two-dimensional barcode on display device 16 together with the keyword and the input field. The two-dimensional barcode, the keyword, and the input field displayed in step S76 are, for example, similar to two-dimensional barcode 201, keyword 202, and input field 203 illustrated in FIG. 13.

In step S77, core controller 51 of client device 1 determines whether or not the keyword displayed on display device 16 has been input from input device 17. When YES, the process proceeds to step S41 of FIG. 16, and when NO, the process repeats step S77.

With reference to FIG. 18, after executing step S92, server device 2 saves in step S93 the verification result into management table 22a and updates the status report.

In the second exemplary embodiment, the status report indicates, for example, which of the following states each storage device 13 is in.

Erasure flag already set
Erasing
Erasure completed
Erasure completed and erasure certificate cannot be issued (provisional)
Erasure completed and erasure certificate can be issued
Erasure completed and erasure certificate already issued
Erasure failed and erasure certificate cannot be issued After executing steps S59 and S93, server device 2 issues in step S60A an erasure certificate based on the erasure result and the verification result.

With reference to FIG. 16, after executing step S70, core controller 51 of client device 1 performs in step S41 post-processing and shuts down client device 1.

Figure 21:
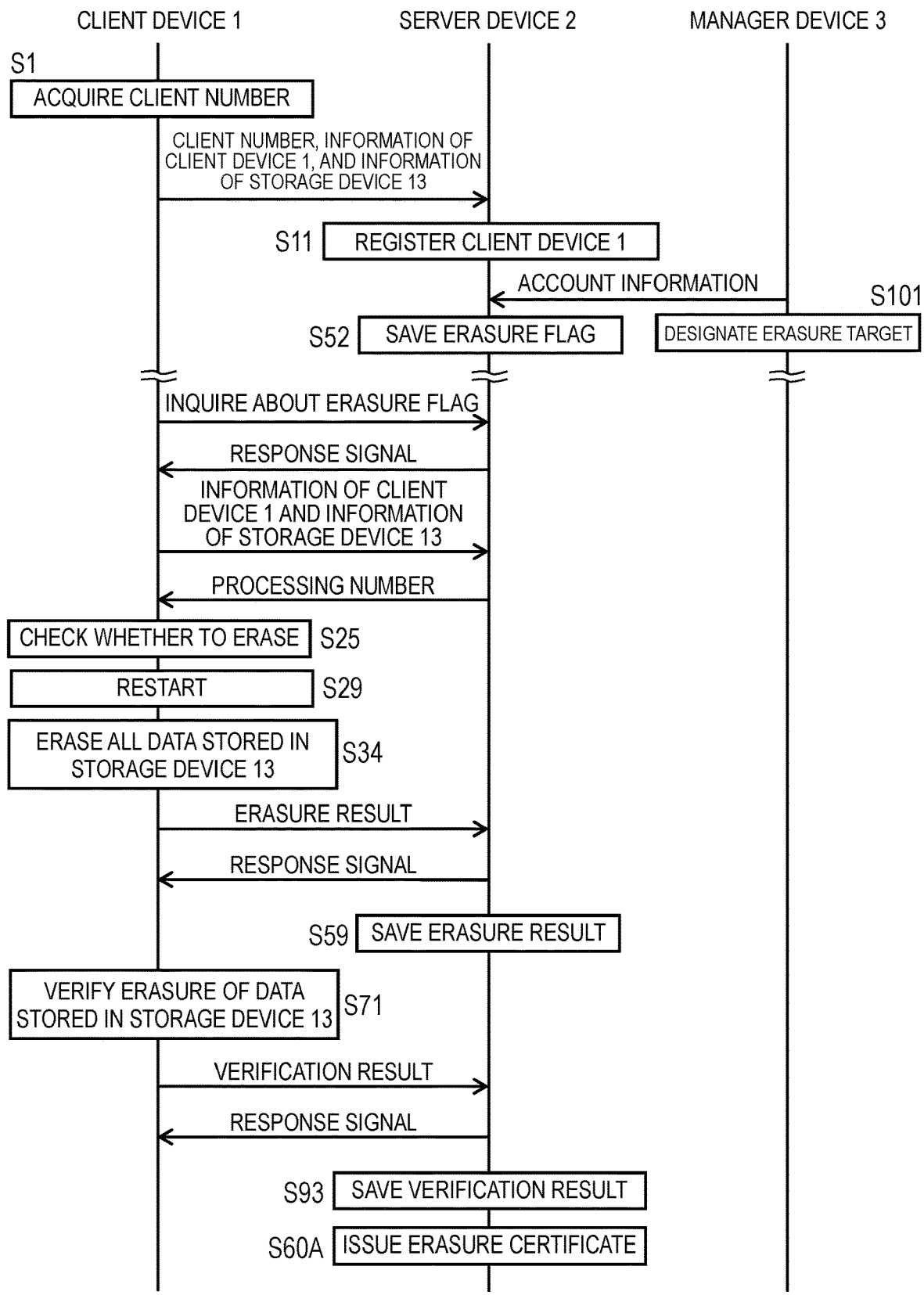
FIG. 21 is a sequence diagram illustrating an operation of system 100 when transmission of erasure result information and verification result information via communication line 6 has been successful, which is an operation of the system according to the second exemplary embodiment.
Figure 22:
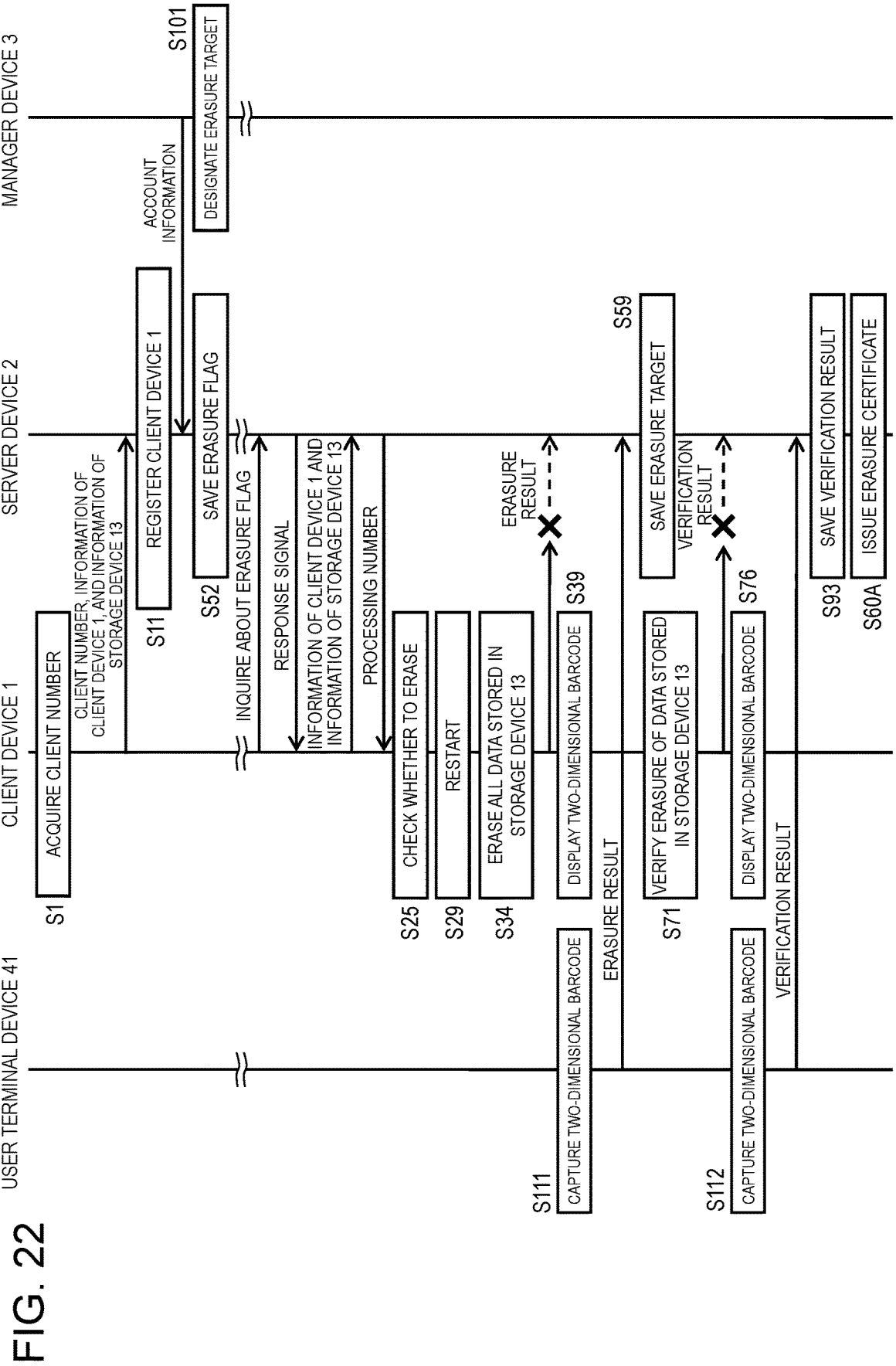
FIG. 22 is a sequence diagram illustrating an operation of system 100 when transmission of erasure result information and verification result information via communication line 6 has failed, which is an operation of the system according to the second exemplary embodiment.

FIG. 21 is a sequence diagram illustrating the operation of system 100 when transmission of erasure result information and verification result information via communication line 6 has been successful, which is an operation of the system according to the second exemplary embodiment. FIG. 22 is a sequence diagram illustrating the operation of system 100 when transmission of erasure result information and verification result information via communication line 6 has failed, which is an operation of the system according to the second exemplary embodiment.

The operations in step S1 to S59 in FIG. 21 are similar to those in the case described with reference to FIG. 14.

When erasing in step S34 all the data stored in storage device 13, then transmitting the erasure result information to server device 2, and receiving a response signal from server device 2, client device 1 verifies that the data stored in storage device 13 has been erased in step S71.

After completion of the verification, client device 1 transmits verification result information to server device 2. When receiving, from server device 2, a response signal to the verification result information within a predetermined timeout period, client device 1 ends the processing.

In step S93, server device 2 stores, in management table 22a, the verification result included in a verification result signal. In step S60A, server device 2 issues an erasure certificate based on the erasure result included in the erasure result signal and the verification result included in the verification result signal.

On the other hand, as illustrated in FIG. 22, in a case where the verification result information transmitted by client device 1 has not reached server device 2, or when a response signal to the verification result information has not been received, client device 1 displays a two-dimensional barcode on display device 16 in step S76.

In step S112, the user of client device 1 captures the two-dimensional barcode displayed on display device 16 of client device 1 using user terminal device 4. Processor 41 of user terminal device 4 decodes the two-dimensional barcode, extracts data indicating the verification result, and transmits this data to server device 2. Hereinafter, steps S93 and S60A of FIG. 22 are similar to the corresponding steps of FIG. 21.

Summary

According to the system according to the second exemplary embodiment, similarly to the system according to the first exemplary embodiment, it is possible to specify, without an error, data stored in storage device 13 and easily erase the data. According to the system according to the second exemplary embodiment, server device 2 is notified of the erasure result at the time point when the erasure of the data stored in storage device 13 is completed, whereby the manager can early recognize the state of storage device 13. This makes it possible not to cause the user and the manager to wait so much even when performing verification of the erasure, and to make it less likely to decrease usability than in a case of not performing verification of the erasure.

For example, when the erasure of the data stored in storage device 13 is successful and the verification result indicates that the erasure is successful, the present system operates as follows. First, after completion of the erasure, client device 1 does not display the erasure result on display device 16 but transmits the erasure result to server device 2 by using communication device 15. When succeeding in transmission of the erasure result, client device 1 displays nothing on display device 16, and when failing to transmission of the erasure result, client device 1 displays a two-dimensional barcode on display device 16. At this time point, the status report becomes "Erasure completed and erasure certificate cannot be issued (provisional)". Thereafter, after completion of the verification, client device 1 does not display the verification result on display device 16 but transmits the verification result to server device 2 by using communication device 15. When succeeding in transmission of the verification result, client device 1 displays nothing on display device 16, and when failing to transmission of the verification result, client device 1 displays a two-dimensional barcode on display device 16. At this time point, the status report becomes "Erasure completed and erasure certificate can be issued".

When the erasure of the data stored in storage device 13 is completed, but the verification result indicates that the erasure fails, the present system operates as follows. First, after completion of the erasure, client device 1 does not display the erasure result on display device 16 but transmits the erasure result to server device 2 by using communication device 15. When succeeding in transmission of the erasure result, client device 1 displays nothing on display device 16, and when failing to transmission of the erasure result, client device 1 displays a two-dimensional barcode on display device 16. At this time point, the status report becomes "Erasure completed and erasure certificate cannot be issued (provisional)". Thereafter, after completion of the verification, client device 1 displays the verification result on display device 16 and transmits the verification result to server device 2 by using communication device 15. When succeeding in transmission of the verification result, client device 1 displays nothing on display device 16, and when failing to transmission of the verification result, client device 1 displays a two-dimensional barcode on display device 16. At this time point, the status report becomes "Erasure failed and erasure certificate cannot be issued".

When the erasure of the data stored in storage device 13 fails, the present system operates as follows. First, after completion of the erasure, client device 1 displays the erasure result on display device 16 but transmits the erasure result to server device 2 by using communication device 15. When succeeding in transmission of the erasure result, client device 1 displays nothing on display device 16, and when failing to transmission of the erasure result, client device 1 displays a two-dimensional barcode on display device 16. At this time point, the status report becomes "Erasure failed and erasure certificate cannot be issued". Verification of erasure is not executed.

When erasing the data stored in storage device 13, client device 1 may display "Erasing" on display device 16. When verifying the erasure, client device 1 may display "Verifying" on display device 16.

Even in a case where the transmission of the erasure result or the verification result fails due to a failure or the like in communication line 6 and the two-dimensional barcode is displayed on display device 16, when communication line 6 is recovered, the erasure result and the verification result are retransmitted and the display of the two-dimensional barcode is stopped.

The system according to the second exemplary embodiment is useful in a case where data stored in storage device 13 is required to be erased, such as a case where client device 1 is discarded or a case where client device 1 is stolen. In particular, when client device 1 is stolen, the manager can erase the data stored in storage device 13 and grasp early the state of storage device 13 while verifying the erasure.

Variation of Second Exemplary Embodiment

As mentioned earlier, it takes a long time to verify erasure. Therefore, in the system according to the second exemplary embodiment, verification of the erasure may be performed in stages. This enables the user or the manager to recognize a progress of verification of the erasure.

FIG. 23 is a flowchart showing a subroutine of step S70A (verification processing) executed by processor 11 of client device 1, which is an operation of the system according to a variation of the second exemplary embodiment. FIG. 24 is a flowchart showing erasure and verification processing of server device 2 executed by processor 21, which are the operation of the system according to the variation of the second exemplary embodiment.

The processing of FIG. 23 is executed instead of step S70 of FIG. 16. The processing of FIG. 24 includes steps S91A to S93A and S94 instead of steps S91 to S93 of FIG. 18.

In this case, a plurality of points to be checked respectively indicating the progress of verification of the erasure are set in advance.

In step S81 of FIG. 23, by using erasure controller 52, core controller 51 of client device 1 verifies, by a designated verification method, that the data stored in storage device 13 has been erased.

In step S82, core controller 51 of client device 1 determines whether or not verification of the erasure has reached a predetermined point to be checked. When YES, the process proceeds to step S83 when NO, and repeats step S82.

In step S83, by using data encoder 53, core controller 51 of client device 1 encodes, by a predetermined encoding method, the verification result and data indicating the progress thereof.

In step S84, core controller 51 of client device 1 uses communication device 15 to transmit, to server device 2, the encoded verification result and data indicating the progress thereof.

In step S91A of FIG. 24, server device 2 determines whether or not the verification result and the progress thereof have been received from client device 1. When YES, the process proceeds to step S92A, and when NO, the process returns to step S51.

In step S92A, server device 2 transmits, to client device 1, an acknowledgment signal for the verification result and the progress thereof.

In step S85 of FIG. 23, core controller 51 of client device 1 determines whether or not all regions that should be processed of the entire storage region of storage device 13 have been verified. When YES, the process proceeds to step S41 of FIG. 16, and when NO, the process proceeds to step S86 of FIG. 23.

In step S86, core controller 51 of client device 1 sets the next point to be checked, and then repeats steps S82 to S86.

With reference to FIG. 24, after executing step S92A, server device 2 saves in step S93A the verification result and the progress thereof into management table 22a, and updates the status report.

In step S94, server device 2 determines whether or not the final verification result has been received. When YES, the process proceeds to step S60A, and when NO, the process returns to step S51.

Due to this, client device 1 transmits, to server device 2, a plurality of signals each indicating that verification of the erasure has been completed to any of a plurality of progresses different from one another.

In a case where verification of the erasure is performed as illustrated in FIG. 19, client device 1 may transmit, to server device 2, a plurality of signals each indicating that verification of the erasure has been completed up to a plurality of predetermined ratios of the entire storage region of storage device 13. In this case, the plurality of points to be checked respectively indicating the progress of verification of the erasure are the ratios of the region where verification of the erasure of the entire storage region of storage device 13 has been completed, for example, 10%, 20%, 30%, . . . , 90%, and 100%. In a case where verification of the erasure is performed as illustrated in FIG. 20, client device 1 may transmit, to server device 2, a plurality of signals each indicating that verification of the erasure has been completed up to a predetermined number of partial regions randomly extracted from a plurality of partial regions obtained by dividing the entire storage region of storage device 13. In this case, the plurality of points to be checked respectively indicating the progress of verification of the erasure are the numbers of small regions 302 to be extracted in each middle region 301, for example, 1, 2, 3, . . . , 9, and 10.

In a case where, after transmitting the verification result and the progress thereof in step S84 of FIG. 23, client device 1 does not receive an acknowledgment signal from server device 2, client device 1 may display, on display device 16, a two-dimensional barcode including information on the verification result and the progress thereof, similarly to the verification processing of FIG. 17. The user of client device 1 can transmit, to server device 2, the verification result and data indicating the progress thereof by capturing the two-dimensional barcode displayed using user terminal device 4.

According to the processing of FIGS. 23 and 24, by performing verification of the erasure in stages, the manager can recognize early the state of storage device 13, and can recognize a more accurate verification result with the lapse of time.

Effects of Second Exemplary Embodiment

According to one aspect of the present disclosure, client device 1 includes storage device 13, communication device 15, and processor 11. Processor 11 registers client device 1 into server device 2 by using communication device 15 to transmit, to server device 2, a first signal including identification information for uniquely identifying storage device 13. Using communication device 15, processor 11 transmits, to server device 2, a second signal including identification information of storage device 13, the second signal inquiring whether or not it is registered in server device 2 that the data stored in storage device 13 should be erased. When receiving, from server device 2, a third signal instructing erasure of the data stored in storage device 13 by using communication device 15, processor 11 erases the data stored in storage device 13. After completing the erasure of all the data stored in storage device 13, processor 11 uses communication device 15 to transmit, to server device 2, the fourth signal including erasure completion information indicating that the erasure of all the data stored in storage device 13 has been completed. Processor 11 verifies that the data stored in storage device 13 has been erased. During the verification or after verification of the erasure, processor 11 uses communication device 15 to transmit, to server device 2, the fifth signal indicating that the verification that the data stored in storage device 13 has been erased has been at least partially completed. The third signal is transmitted from server device 2 to client device 1 when server device 2 determines that the identification information of storage device 13 included in the second signal matches the identification information of storage device 13 included in the first signal and it is registered in server device 2 that the data stored in storage device 13 should be erased.

This makes it possible not to cause the user and the manager to wait so much even when performing verification of the erasure, and to make it less likely to decrease usability than in a case of not performing verification of the erasure.

According to one aspect of the present disclosure, processor 11 may transmit, to server device 2, a plurality of fifth signals each indicating that verification of the erasure has been completed to any of a plurality of progresses different from one another.

This enables the manager to recognize early the state of the storage device, and can recognize a more accurate verification result with the lapse of time.

According to one aspect of the present disclosure, processor 11 may transmit, to server device 2, a plurality of fifth signals each indicating that the verification of the erasure has been completed up to a plurality of predetermined ratios of an entire storage region of storage device 13.

This makes it possible to finally verify the erasure of the data stored in the entire storage region of the storage device.

According to one aspect of the present disclosure, processor 11 may transmit, to server device 2, a plurality of fifth signals each indicating that verification of the erasure has been completed up to a plurality of a predetermined number of partial regions randomly extracted from a plurality of partial regions obtained by dividing an entire storage region of storage device 13.

This can early complete verification of the erasure.

According to one aspect of the present disclosure, storage device 13 may store data including an operating system, an application program, and user data. In this case, client device 1 further includes storage device 14 storing a firmware program. By executing the firmware program, processor 11 erases all the data stored in storage device 13, and verifies that the data stored in storage device 13 has been erased.

This can erase all data stored in the storage device including the operating system.

According to one aspect of the present disclosure, client device 1 may further include display device 16. In this case, when processor 11 does not receive, from server device 2, an acknowledgment signal for the fourth signal, by executing the firmware program, processor 11 displays, on display device 16, two-dimensional barcode 201 including the erasure completion information indicating that the erasure of all the data stored in storage device 13 has been completed.

Due to this, even when communication with the server device is not possible, information necessary for creation of the erasure certificate can be acquired.

According to one aspect of the present disclosure, when processor 11 does not receive, from server device 2, an acknowledgment signal for the fifth signal, by executing the firmware program, processor 11 may display, on display device 16, a second two-dimensional barcode including verification completion information indicating that verification of the erasure has been completed.

Due to this, even when communication with the server device is not possible, information necessary for creation of the erasure certificate can be acquired.

According to one aspect of the present disclosure, a system including the plurality of client devices 1 described above and server device 2 is provided.

This makes it possible not to cause the user and the manager to wait so much even when performing verification of the erasure, and to make it less likely to decrease usability than in a case of not performing verification of the erasure.

According to one aspect of the present disclosure, server device 2 may acquire, from client device 1, erasure completion information indicating that the erasure of all the data stored in storage device 13 has been completed, and may acquire, from client device 1, verification completion information indicating that verification that the data stored in storage device 13 has been erased has been completed. In this case, based on the erasure completion information and the verification completion information, server device 2 issues an erasure certificate certifying that the erasure of all the data stored in storage device 13 has been completed.

This makes it possible to issue the erasure certificate certifying that the erasure of all the data stored in the storage device has been completed.

According to one aspect of the present disclosure, a method for erasing data stored in a storage device of client device 1 is provided. The present method includes registering client device 1 into server device 2 by transmitting, from client device 1 to server device 2, the first signal including identification information for uniquely identifying the storage device. The present method includes transmitting, from client device 1 to server device 2, a second signal including identification information of the storage device, the second signal inquiring whether or not it is registered in server device 2 that the data stored in the storage device should be erased. The present method includes erasing data stored in a storage device when the third signal instructing erasure of the data stored in the storage device is received from server device 2. The present method includes, after completing the erasure of all the data stored in the storage device, transmitting, from client device 1 to server device 2, the fourth signal indicating that the erasure of all the data stored in the storage device has been completed. The present method includes verifying that the data stored in the storage device has been erased. The present method includes transmitting, from client device 1 to server device 2, a fifth signal indicating that verification that the data stored in the storage device has been erased has been at least partially completed during verification or after verification of the erasure. The third signal is transmitted from server device 2 to client device 1 when server device 2 determines that the identification information of the storage device included in the second signal matches the identification information of the storage device included in the first signal and it is registered in server device 2 that the data stored in the storage device should be erased.

This makes it possible not to cause the user and the manager to wait so much even when performing verification of the erasure, and to make it less likely to decrease usability than in a case of not performing verification of the erasure.

Other Exemplary Embodiments

The exemplary embodiment has been described as exemplification of the technique disclosed in the present application. However, the technique in the present disclosure is not limited to the exemplary embodiment and is applicable to exemplary embodiments appropriately subjected to changes, replacements, additions, omissions, and the like. It is also possible to combine the components described in the above-described exemplary embodiment to form a new exemplary embodiment.

Thus, hereinafter, other exemplary embodiments are illustrated as examples.

When issued, erasure permission may be issued by designating the model. By describing not only the model but also user information in remarks, in a case where the user has a model different from the designated model, the erasure permission of the designated model may be issued. A list of designated models may be displayed, and the manager may issue the erasure permission. This has an effect of being capable of managing client device 1 reflecting the intention of the user so as to discard a model having a predetermined feature or discard a model not having a predetermined feature (e.g., to discard a model not having both forms (so-called "2 in 1") of a laptop computer and a tablet computer). This has an effect of enabling to discard from an older model, for example.

The erasure permission may be issued by designating a manufacturer of storage device 13. This has an effect of enabling to eliminate client device 1 supplied from a manufacturer that tends to easily cause a failure.

Management table 22a may have a remark field where an arbitrary character string can be input. By describing the user information in the remark field, it is possible to list the users using the plurality of client devices 1 and issue the erasure permission. This has an effect of enabling to reduce the total number of client devices 1. By describing the user information in the remark field, it becomes easy to handle the plurality of client devices 1 in units of department, section, or the like.

Self-monitoring analysis and reporting technology (S.M.A.R.T.) information of client device 1 may be transmitted to server device 2 to find client device 1 in a poor state, and the erasure permission may be issued based on the information. In order to evaluate the state of storage device 13 based on the S.M.A.R.T. information, for example, the number of sectors subjected to alternative processing, the number of times of powering on, an error rate generated by impact, a use time length, a temperature, an increase amount of the above parameters as viewed from server device 2, a combination of these, and the like may be used. The state of client device 1 may be calculated based on the S.M.A.R.T. information in client device 1, and the state may be transmitted to server device 2 as remark information. Registered client device 1 may periodically send the S.M.A.R.T. information to server device 2, whereby server device 2 may be able to grasp the states of all client devices 1. Registered client device 1 may periodically calculate the state of client device 1 based on the S.M.A.R.T. information of client device 1 and transmit the state to server device 2 as remark information, whereby server device 2 may be able to grasp the states of all client devices 1. This has an effect of enabling to subject, as a discard target, from client device 1 in a poorer state.

The use time of client device 1 may be sent to server device 2, whereby client device 1 in a poor state may be found, and the erasure permission may be issued based on the information. The use time of client device 1 may be transmitted to server device 2 as remark information. This has an effect of enabling to subject, as a discard target, from client device 1 having a long use time.

Stress information of client device 1 may be transmitted to server device 2, whereby client device 1 in a poor state may be found, and the erasure permission may be issued based on the information. The stress of client device 1 may be transmitted to server device 2 as remark information. This has an effect of enabling to subject, as a discard target, from client device 1 having been used in a high-load environment.

In the examples of FIGS. 10, 12, 14, and 15, the inquiry of the erasure flag and the transmission of the information of client device 1 and the information of storage device 13 are separately performed from client device 1 to server device 2, but these communications may be performed simultaneously. When receiving the information of client device 1 and the information of storage device 13 from client device 1, server device 2 may consider that server device 2 has received an inquiry about the erasure flag.

The examples of FIGS. 10 to 12, 14, and 15 describe a case of restarting client device 1 to transition from erasure processing by the combination of erasure application program 70 and firmware program 50 to erasure processing by only firmware program 50. However, client device 1 may be configured to transition from erasure processing by the combination of erasure application program 70 and firmware program 50 to erasure processing by only firmware program 50 without being restarted.

The example of FIG. 2 describes a case where client device 1 includes only one storage device 13 from which stored data should be erased, but client device 1 may include a plurality of storage devices 13 from which stored data should be erased. The plurality of storage devices 13 may be configured as, for example, redundant arrays of inexpensive disks (RAID) devices. In this case, the plurality of storage devices 13 are handled as an integrated device, the data stored therein is integrally erased, and the erasure result is integrally verified. The plurality of storage devices 13 may be handled individually, the data stored therein may be individually erased, and the erasure result may be individually verified.

In the second exemplary embodiment, the user or the manager may be allowed to select necessity of verification of erasure. When erasure is not verified, the processing can be completed in the same time as in the first exemplary embodiment.

When data stored in storage device 13 is erased, in a case where the secure erase is designated as the erasure method but failed and overwrite three times erasure is successfully performed as an alternative, the overwrite three times erasure is described as the erasure result information. For firmware program 50, alternative processing at the time of erasure failure is set in advance. For example, every time the erasing fails, the erasure method may be changed in the order of secure erase→overwrite three times erasure→overwrite one time erasure.

As described above, the exemplary embodiments have been described as examples of the technique in the present disclosure. To this end, the accompanying drawings and detailed description have been provided.

Therefore, the components illustrated in the accompanying drawings or described in the detailed description can include not only the components essential for solving the problem but also components not essential for solving the problem in order to exemplify the above technique. For this reason, it should not be immediately construed that those non-essential components are essential only based on the fact that those non-essential components are illustrated in the accompanying drawings or described in the detailed description.

The above-described exemplary embodiments are intended to exemplify the technique in the present disclosure, and thus various changes, replacements, additions, omissions, and the like can be made to the exemplary embodiments within the scope of the claims or equivalents of the claims.

An electronic apparatus according to one aspect of the present disclosure is useful for erasing data stored in a storage device.

What is claimed is:

1. An electronic apparatus comprising:
a first storage device;
a communication device; and
a processor,
wherein
the processor
causes a server device to register the electronic apparatus by transmitting a first signal to the server device using the communication device, the first signal including identification information for uniquely identifying the first storage device,
transmits a second signal to the server device using the communication device, the second signal including identification information of the first storage device, and inquiring whether or not the server device has registered therein that data stored in the first storage device is to be erased, and
erases the data stored in the first storage device when the electronic apparatus receives a third signal from the server device using the communication device, the third signal instructing erasure of the data stored in the first storage device, and
the third signal is transmitted from the server device to the electronic apparatus when the server device determines that the identification information of the first storage device included in the second signal matches the identification information of the first storage device included in the first signal and the server device has registered therein that the data stored in the first storage device is to be erased,
further comprising a second storage device storing a firmware program,
wherein
the data stored in the first storage device includes an operating system, an application program, and user data, and
the processor erases the data stored in the first storage device by executing the firmware program,
wherein after the erasure of the data stored in the first storage device has been completed, the processor transmits a fourth signal to the server device using the communication device by executing the firmware program, the fourth signal indicating that the erasure of the data stored in the first storage device has been completed, further comprising a display device,
wherein the processor displays a first two-dimensional barcode on the display device by executing the firmware program when not receiving an acknowledgment signal for the fourth signal from the server device, the first two-dimensional barcode including erasure completion information indicating that the erasure of the data stored in the first storage device has been completed.

2. The electronic apparatus according to claim 1, wherein the second signal includes a sixth signal for inquiring whether or not the server device has registered therein that the data stored in the first storage device is to be erased, and a seventh signal including the identification information of the first storage device, and
the processor
transmits the sixth signal to the server device using the communication device, and
transmits the seventh signal to the server device using the communication device when receives an eighth signal from the server device using the communication device, the eighth signal indicating that the server device has registered therein that the data stored in the first storage device is to be erased.

3. The electronic apparatus according to claim 1, wherein the identification information of the first storage device includes at least some of a manufacturer of the electronic apparatus, a model of the electronic apparatus, a serial number of the electronic apparatus, a universally unique identifier (UUID) of the electronic apparatus, a manufacturer of the first storage device, a model of the first storage device, a serial number of the first storage device, a UUID of the first storage device, and a capacity of the first storage device.

4. A system comprising:
a plurality of electronic apparatuses, each of which is the electronic apparatus according to claim 1; and
the server device.

5. The system according to claim 4, wherein the server device
acquires, from the electronic apparatus, erasure completion information indicating that the erasure of the data stored in the first storage device has been completed, and
issues, based on the erasure completion information, an erasure certificate certifying that the erasure of the data stored in the first storage device has been completed.

6. The system according to claim 5, wherein
the third signal includes a processing number issued to the first storage device of each of the plurality of electronic apparatuses registered in the server device that the data stored in the first storage device is to be erased, and
the erasure completion information includes the processing number, a universally unique identifier (UUID) of the first storage device, an erasure start time, an erasure completion time, and an erasure method.

7. An electronic apparatus comprising:
a first storage device;
a communication device; and
a processor,
wherein
the processor,
causes a server device to register the electronic apparatus by transmitting a first signal to the server device using the communication device, the first signal including identification information for uniquely identifying the first storage device,
transmits a second signal to the server device using the communication device, the second signal including identification information of the first storage device, and inquiring whether or not the server device has registered therein that data stored in the first storage device is to be erased, and
erases the data stored in the first storage device when the electronic apparatus receives a third signal from the server device using the communication device, the third signal instructing erasure of the data stored in the first storage device, and
the third signal is transmitted from the server device to the electronic apparatus when the server device determines that the identification information of the first storage device included in the second signal matches the identification information of the first storage device included in the first signal and the server device has registered therein that the data stored in the first storage device is to be erased,
wherein the processor
transmits a fourth signal to the server device using the communication device after the erasure of the data stored in the first storage device has been completed, the fourth signal indicating that the erasure of the data stored in the first storage device has been completed,
verifies the erasure of the data stored in the first storage device, and
transmits at least one fifth signal to the server device using the communication device, during verification or after verification of the erasure, the at least one fifth signal indicating that verification of the erasure of the data stored in the first storage device has been at least partially completed.

8. The electronic apparatus according to claim 7, wherein the at least one fifth signal is a plurality of fifth signals, and
the plurality of fifth signals each indicate that the verification of the erasure has been completed to any of a plurality of progresses different from one another.

9. The electronic apparatus according to claim 7, wherein the at least one fifth signal is a plurality of fifth signals, and
the plurality of fifth signals each indicate that the verification of the erasure has been completed up to a plurality of predetermined ratios of an entire storage region of the first storage device.

10. The electronic apparatus according to claim 7, wherein
the at least one fifth signal is a plurality of fifth signals, and
the plurality of fifth signals each indicate that the verification of the erasure has been completed up to a plurality of predetermined number of partial regions randomly extracted from a plurality of partial regions obtained by dividing an entire storage region of the first storage device.

11. The electronic apparatus according to claim 7, further comprising a second storage device storing a firmware program,
wherein
the data stored in the first storage device includes an operating system, an application program, and user data, and
the processor erases the data stored in the first storage device and verifies that the data stored in the first storage device has been erased, by executing the firmware program.

12. The electronic apparatus according to claim 11, further comprising a display device, wherein the processor displays a first two-dimensional barcode on the display device by executing the firmware program when not receiving an acknowledgment signal for the fourth signal from the server device, the first two-dimensional barcode including erasure completion information indicating that the erasure of the data stored in the first storage device has been completed.

13. The electronic apparatus according to claim 12, wherein the processor displays a second two-dimensional barcode on the display device by executing the firmware program when not receiving an acknowledgment signal for the at least one fifth signal from the server device, the second two-dimensional barcode including verification completion information indicating that verification of the erasure has been completed.

14. A system comprising:

a plurality of electronic apparatuses, each of which is the electronic apparatus according to claim 7; and
the server device.

15. The system according to claim 14, wherein the server device acquires, from the electronic apparatus, erasure completion information indicating that the erasure of the data stored in the first storage device has been completed,
acquires, from the electronic apparatus, verification completion information indicating that verification that the data stored in the first storage device has been erased has been completed, and
issues, based on the erasure completion information and the verification completion information, an erasure certificate certifying that the erasure of the data stored in the first storage device has been completed.

16. A method for erasing data stored in a storage device of an electronic apparatus, the method comprising:

causing a server device to register the electronic apparatus by transmitting a first signal from the electronic apparatus to the server device using the communication device, the first signal including identification information for uniquely identifying the storage device;

transmitting a second signal from the electronic apparatus to the server device, the second signal including identification information of the storage device and inquiring whether or not the server device has registered therein that data stored in the storage device is to be erased; and erasing the data stored in the storage device when the electronic apparatus receives from the server device, the third signal instructing erasure of the data stored in the storage device, wherein the third signal is transmitted from the server device to the electronic apparatus when the server device determines that the identification information of the storage device included in the second signal matches the identification information of the storage device included in the first signal and the server device has registered therein that the data stored in the storage device is to be erased, further comprising:

transmitting a fourth signal from the electronic apparatus to the server device after the erasure of the data stored in the storage device has been completed, the fourth signal indicating that erasure of the data stored in the storage device has been completed;

verifying that the data stored in the storage device has been erased; and transmitting a fifth signal from the electronic apparatus to the server device during verification or after verification of the erasure, the fifth signal indicating that verification of the erasure of the data stored in the storage device has been at least partially completed.

* * * * *